Figure 3:
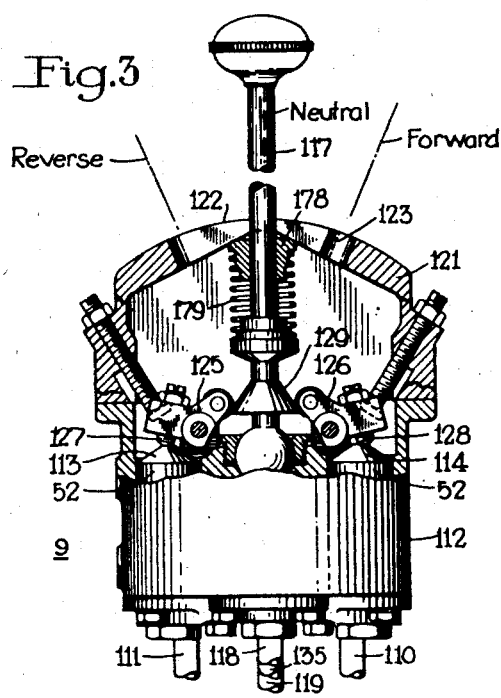

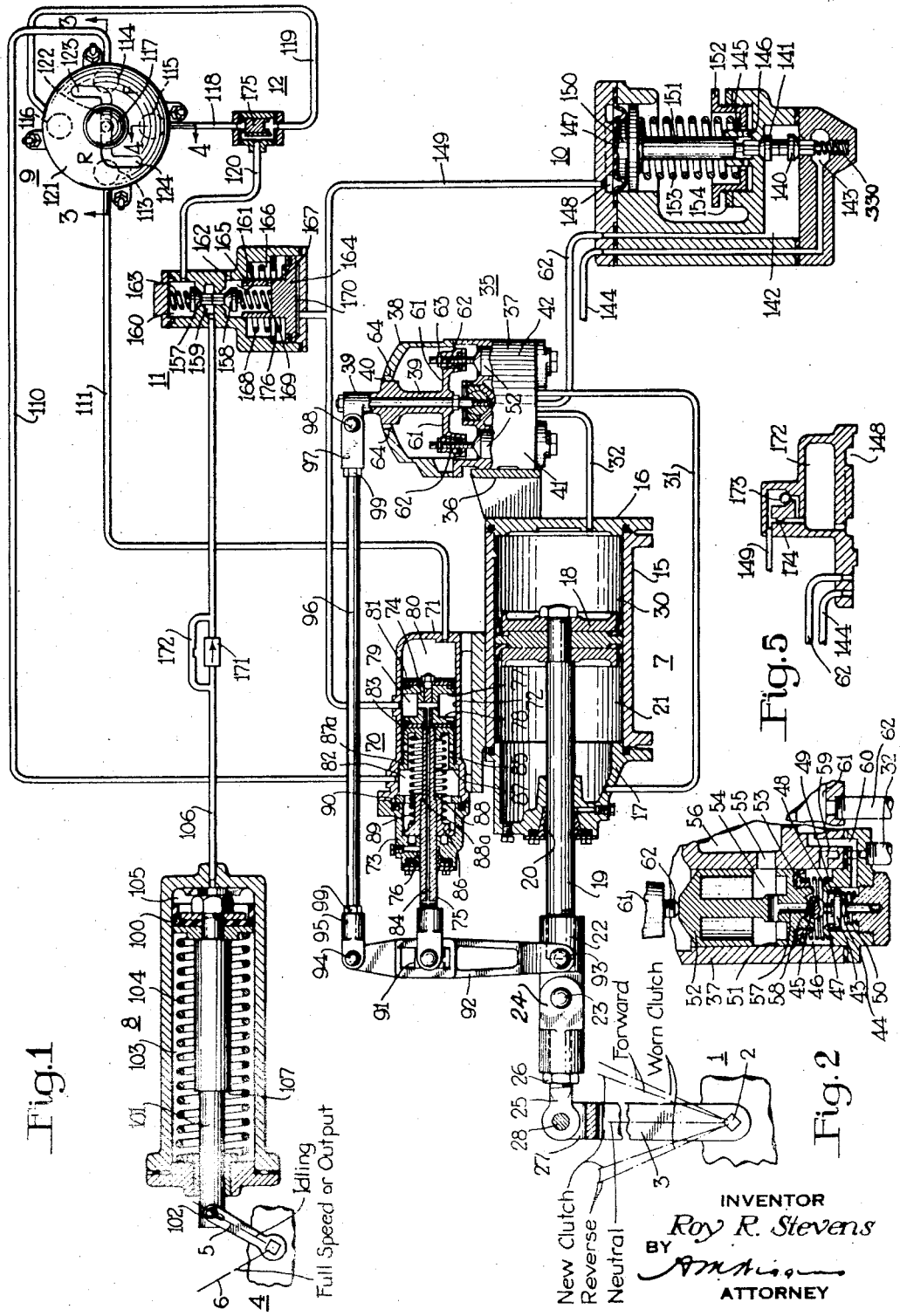

Aug. 19, 1947.   R. R. STEVENS   2,426,063
CLUTCH OPERATING MECHANISM
Filed June 23, 1942   3 Sheets-Sheet 2

INVENTOR
*Roy R. Stevens*
BY
ATTORNEY

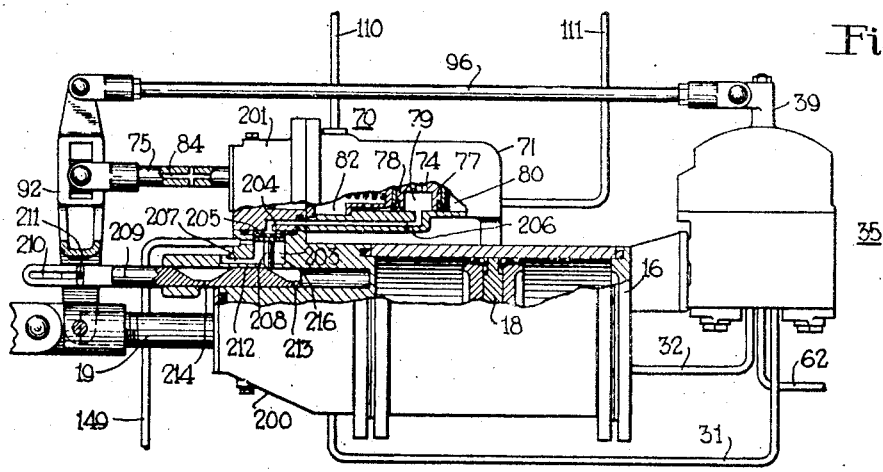
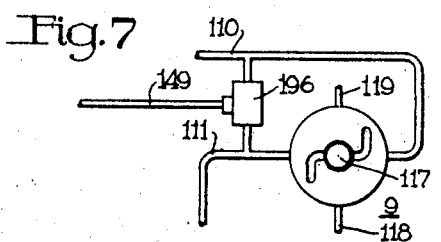
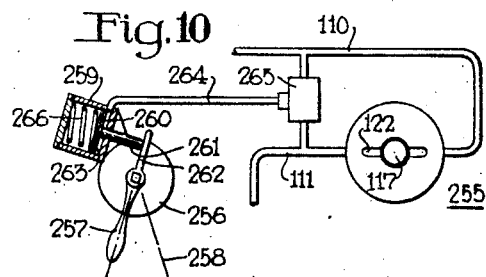
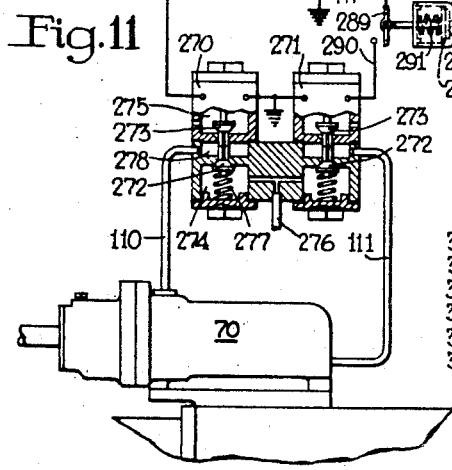
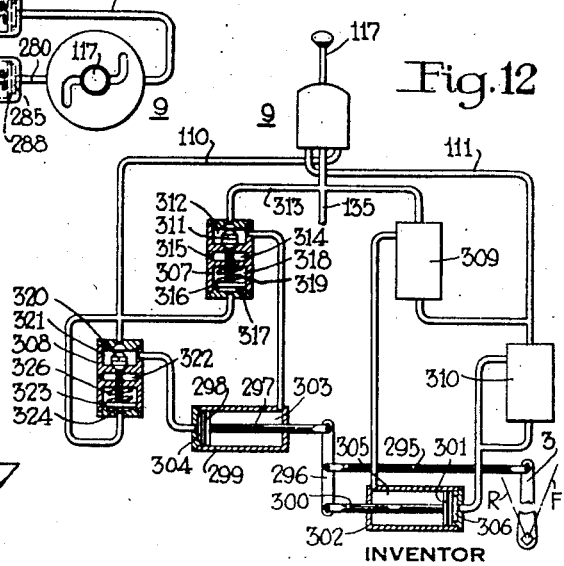
INVENTOR
Roy R. Stevens
BY
ATTORNEY Patented Aug. 19, 1947

2,426,063

UNITED STATES PATENT OFFICE 2,426,063

CLUTCH OPERATING MECHANISM

Roy R. Stevens, Forest Hills, Pa., assignor to The Westinghouse Air Brake Company, Wilmerding, Pa., a corporation of Pennsylvania Application June 23, 1942, Serial No. 448,167

24 Claims. (Cl. 192—87)

This invention relates to clutch operating mechanism and more particularly to manually controlled power means for controlling the operation of clutches, fuel supply devices for governing the speed or power output of internal combustion engines, etc.

In certain water craft internal combustion engines are employed for driving the propeller to propel the craft. The engines are provided with fuel supply governing means which is adjustable to vary the power output or speed of the engine and thereby the speed of the craft, and a clutch is used to connect and disconnect the engine to and from the propeller.

The clutch employed in certain of these crafts has a driving part connected with the engine and a driven part connected with the propeller. The driven part has a forward position for cooperation with the driving part to impart forward movement to the craft, a reverse position for cooperation with the driving part to propel the craft in reverse and a neutral position intermediate the forward and reverse positions for disconnecting the engine and propeller. Power is required for moving the driven part of the clutch to each of its different positions. Such movement of the driven part is usually opposed by pressure means of the over-center type which act in the forward and reverse positions to hold the driving and driven parts in driving relation with each other while in the neutral position the pressure means maintains the clutch driving and driven parts free of each other. After the driven part is moved to a selected position, the power employed for actuating same may therefore be removed. Such removal of power is also desirable in order that the clutch parts including a thrust bearing usually employed between the power means and driven part of the clutch be relieved of an unnecessary load or force which might cause undue wear.

One object of the invention is the provision of an improved manually controlled power mechanism for selectively moving a device such as the driven part of a clutch to any one of a plurality of different positions.

Another object of the invention is the provision of a selective clutch control positioning power mechanism which is positive in operation in accordance with a selected movement of a manual control member.

Another object of the invention is the provision of a clutch control system operative automatically to compensate for wear in the clutch parts and in pin and link connections to such parts, so as to insure positive and selective operation of the clutch throughout its useful life.

Another object of the invention is the provision of a clutch control system embodying power means for moving the driven part of the clutch to any selected one of a plurality of different positions in accordance with a selected operation of a manual control element and also embodying means operative automatically to relieve the clutch of the power or force of said power means after and only after the attainment of such selected position has been assured.

Another object of the invention is the provision of means for adjusting the fuel supply device for the engine to its engine idling position upon or prior to disengagement of the clutch.

Still another object of the invention is the provision of means for maintaining the fuel supply device adjusted to its idling position until after engagement of the clutch.

Another object of the invention is the provision of a system for controlling a clutch and the adjustment of a fuel supply device for an engine embodying a manual control device so designed as to insure adjustment of the fuel supply device to provide for idling operation of the engine upon or prior to disengaging the clutch and for maintaining this adjustment of the fuel supply device until the clutch is subsequently engaged.

Another object of the invention is the provision of a control system so designed and arranged as to insure automatic attainment of any and all of the above objects with no attention on the part of the operator other than the movement of a manual control lever or control handle to a desired position.

Other objects and advantages will be apparent from the following more detailed description of the invention.

Figure 4:
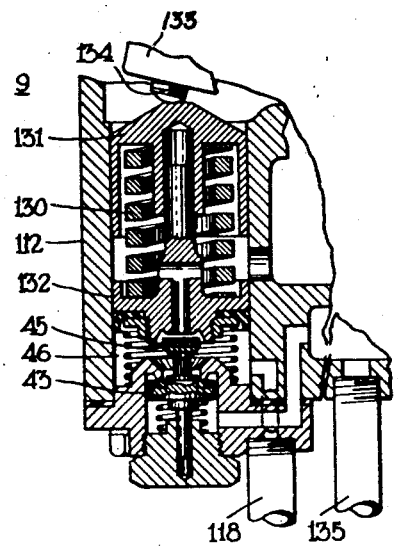
Figure 9:
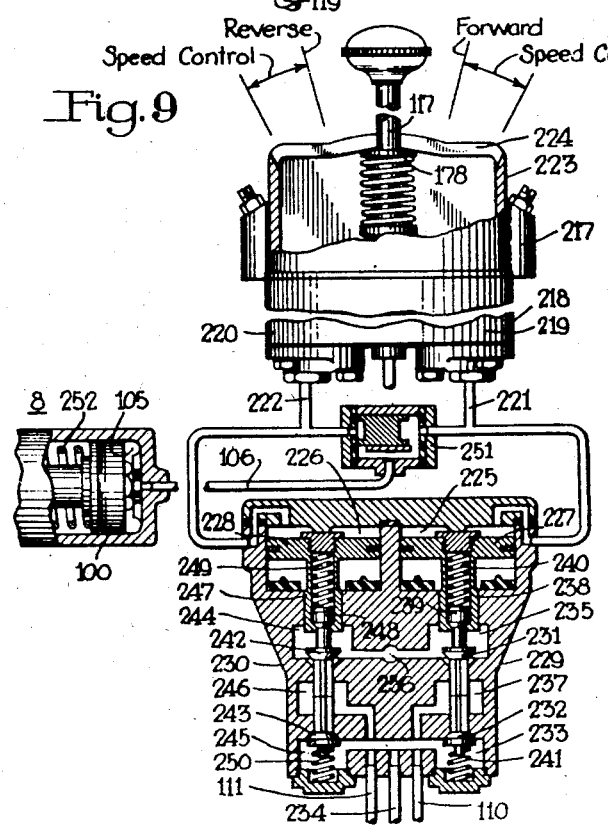
Figure 6:
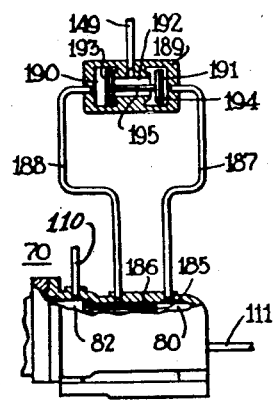

In the accompanying drawings: Fig. 1 is a diagrammatic view, mainly in section, of a combined clutch and fuel control system constructed in accordance with one embodiment of the invention; Fig. 2 is a sectional view, on an enlarged scale, of a valve device embodied in the apparatus shown in Fig. 1; Figs. 3 and 4 are sectional views taken on the lines 3—3 and 4—4, respectively, of Fig. 1; Fig. 5 is a sectional view of a modification of a portion of the structure shown in Fig. 1; Figs. 6 to 8 are diagrammatic views, partly in section, of different embodiments of the invention; Fig. 9 is a diagrammatic view, mainly in section, of a portion of a clutch and fuel supply control system constructed in accordance with another embodiment of the invention; and Figs, 10 to 12 are diagrammatic views, partly in section, showing still other embodiments of the invention.

Description—Figures 1 to 4

In Fig. 1 the reference numeral 1 indicates a portion of a clutch housing which may contain a three position clutch, such as above described. A rock shaft 2 is provided for moving the driven part of the clutch in housing 1 to its different positions and this shaft is operable by a lever or arm 3 which has a "Forward" position, a "Reverse" position, and a "Neutral" or disengaged position for correspondingly positioning the driven part of the clutch. These positions are indicated by dash lines and appropriate legends in Fig. 1, and it will be noted that at one side of the "Neutral" position there are two positions designated "Reverse" and at the opposite side two positions designated "Forward." The two dash lines, designated "Forward" and "Reverse" which are closest to the "Neutral" position of lever 3, indicate the extent of movement of said lever from "Neutral" position for effecting engagement of the clutch to provide for movement of the craft either forwardly or in reverse when the clutch is new, while the two dash lines most remote from said lever at either side thereof indicate positions which said lever will assume to condition the driven part of the clutch to provide for movement of the craft either forwardly or in reverse after the clutch parts have become worn. In other words the two dash lines designating "Forward" and/or "Reverse" indicate the extreme positions which the arm 3 may attain during the life of a clutch.

The reference numeral 4 indicates a portion of a fuel supply device for an internal combustion engine. This device may be of any desired type capable of adjustment, as by a lever 5, to provide for varying speeds or degrees of output of the engine. The lever may therefore have an engine idling position in which it is shown and be movable therefrom in a counterclockwise direction as viewed in the drawing to increase the speed or output of the engine in accordance with the extent of such movement from idling position, the maximum speed or output being obtainable in a position such as indicated by a dash line 6.

The invention constitutes means for selectively moving the clutch control lever 3 to any one of its three different positions, for adjusting the fuel supply control lever 5, and for insuring that the fuel supply lever 5 will be in the engine idling position shown when engaging and disengaging a clutch by operation of the clutch lever 3 and at all times when said lever is out of its "Forward" and "Reverse" positions. To this end the control mechanism therefore comprises a clutch control device 7 for moving the clutch lever 3 to its different positions; a fuel supply control device 8 for adjusting the fuel supply lever 5; a manual controller 9 for controlling the operation of the devices 7 and 8 and so arranged as to provide for the fuel supply lever 5 being in engine idling position when the clutch controlled by lever 3 is disengaged; a cutoff valve device 10 provided to relieve the clutch operating lever 3 of force upon completion of movement of the clutch to any selected position; an interlock valve device 11 provided to insure that the fuel supply control lever 5 will remain in idling position until after the clutch controlled by arm 3 is engaged; and a double check valve device 12.

The clutch control device 7 comprises a cylinder 15 having a piston bore closed at one end by a pressure head 16 and at the opposite end by a pressure head 17. A master or clutch control piston 18 for controlling the positioning of clutch arm 3 is slidably mounted in the bore in casing 15 and has a rod 19 extending through the pressure head 17. A suitable packing 20 is provided around the rod 19 and secured to head 17 for preventing leakage of fluid under pressure from a chamber 21, provided at one side of the piston, past said rod to the atmosphere.

A nut 22 is secured to the end of rod 19 projecting from or beyond the pressure head 17 and to this nut is secured, by means of a pin 23, one end of a clevis 24. An eye bolt 25 has one end secured in the opposite end of clevis 24 by screw-threaded engagement, and carries a lock nut 26 for engagement with the end of the clevis to hold the eye bolt rigid with respect to said nut in an adjusted position. The other end of the eye bolt is mounted between jaws 27 provided in the end of the clutch control lever 3 and is pivotally connected to the jaws by means of a pin 28.

As above mentioned, the piston 18 has at one side a pressure chamber 21. At the opposite side of this piston is a pressure chamber 30 and these two chambers are connected by pipes 31 and 32, respectively, to a master controller 35 which is rigidly associated with the cylinder 15 by being preferably mounted on a bracket 36 which projects from the pressure head 16.

The controller 35 comprises a casing or body portion 37 and a cover portion 38 secured to the upper end of the body portion. A lever 39 having one end fulcrumed in the casing 37 extends through a slot 40 provided in the top wall of cover 38, the fulcrum and said slot providing for rocking movement of the lever only in a direction parallel to the axis of the cylinder 15. Between the fulcrum for lever 39 and the adjacent end of the cylinder 15 is a valve device 41 arranged for operation by lever 39 upon counterclockwise movement from a neutral position shown for supplying fluid under pressure to chamber 30 in cylinder 15 and upon movement in the reverse direction for releasing fluid under pressure from said chamber while maintaining the supply communication to the chamber closed. At the opposite side of the fulcrum for lever 39 is a valve device 42 for supplying fluid under pressure to and releasing same from pressure chamber 21 upon rocking of the lever 39 first in a clockwise direction from neutral and then in a counterclockwise direction toward neutral.

Both of the valve devices 41 and 42 may be identical in structure and as shown in Fig. 2 each may comprise a supply valve 43 contained in a chamber 44 and a release valve 45 contained in a chamber 46. Both of these valves are mounted on a common stem 47 which extends through an opening 48 connecting the chambers 44 and 46. This opening is encircled in chamber 44 by an annular seat rib 49 arranged to be engaged by the supply valve 43 for closing communication between the chamber 44 and chamber 46. A spring 50 in chamber 44 acts on the supply valve 43 for urging same into contact with the rib 49.

The chamber 46 containing the release valve 45 is in the form of a bore in which is slidably mounted above said valve two connected plungers 51 and 52. On the face of plunger 51 adjacent the exhaust valve 45 is a packing cup 53 having sliding contact with the wall of chamber 46 and so arranged as to prevent leakage of fluid under pressure from said chamber past the plunger 51 to a chamber 54 provided between the two plungers and which is constantly open to the atmosphere through a passage 55, a chamber 56, and an opening (not shown). The plunger 51 is provided with an axial bore 57 open at one end to the atmospheric chamber 54 and at the opposite end to chamber 46 wherein the open end of said bore is encircled by a seat rib 58 provided for engagement by the release valve 45 for closing communication between chamber 46 and the chamber 54. A light bias spring 59 in chamber 46 acts on the plunger 51 for urging same and thereby the plunger 52 in a direction away from the release valve 45.

The supply valve chamber 44 in each of the valve devices 41 and 42 is connected by a passage 60 to a cavity 61 arranged to be supplied with fluid under pressure through a pipe 62. The chamber 46 in the valve device 41 is connected to the pipe 32, while in the valve device 42 said chamber is connected to the pipe 31.

The lever 39 is provided with two oppositely arranged arms 61 terminating respectively over the two plungers 52 of the valve devices 41 and 42, and in the end of each of these arms is an adjusting screw 62 arranged to engage the respective plunger 52. A lock nut 63 is provided on each screw 62 for securing same in an adjusted position.

With the lever 39 in neutral position at right angles to the axis of piston rod 18, both adjusting screws 62 are so adjusted that plungers 52 and 51 in the two valve devices 41 and 42 will be positioned substantially as shown in Fig. 2, in which position the plunger 51 is just disengaged from or out of sealing contact with the release valve 45. When so adjusted, the pressure chamber 30 in the cylinder 15 will be opened through the pipe 32 and past the release valve 45 in the valve device 41 to chamber 54 and thence to the atmosphere. Also chamber 21 at the opposite side of the master piston 18 will be open to the atmosphere past the release valve 45 in the valve device 42.

Rocking of the lever 39 in a counterclockwise direction from its neutral position will shift the plungers 52 and 51 in the valve device 41 in a downwardly direction against the pressure of bias spring 59. This movement initially will be relative to the release valve 45 and then plunger 51 will engage said valve to close communication between chamber 46 and atmospheric chamber 54. Further downward movement of the plungers 52 and 51 will then act to move the release valve 45 and thereby the supply valve 43 in a downwardly direction and unseat the supply valve 43 from the seat rib 49. With the supply valve 43 unseated fluid under pressure will flow from the supply pipe 62 past said valve to chamber 46 and thence through the pipe 32 to pressure chamber 30 in the cylinder device 15 for acting on the master piston 18 to effect movement thereof in the direction of the left-hand. Return of the lever 39 to its neutral position will first permit seating of the supply valve 43 by spring 50 and then movement of plunger 51 away from the release valve 45, due to which, fluid under pressure will be released from chamber 30 in the cylinder 15 past said release valve to atmosphere. Likewise, movement of the lever 39 in a clockwise direction from its neutral position shown will first seat the release valve 45 and then unseat the supply valve 43 in the valve device 42 so as to supply fluid under pressure from pipe 62 through pipe 31 to pressure chamber 21 in the cylinder device 15, while return of the lever to neutral position will open chamber 21 to atmosphere past the release valve 45 in valve device 42.

For reasons to be hereinafter described, it is desired to limit movement of the lever 39 out of its neutral position shown, in both directions to a degree just sufficient to insure opening of the supply valve 43 in the valve devices 41 or 42 an amount which will provide for prompt charging of the respective pressure chambers 30 or 21 with fluid under pressure. To accomplish this end the length of the slot 40 may be limited so that the opposite ends 64 thereof may act as stops for engagement by lever 39.

A pilot device 70 is rigidly secured to the cylinder 15 and comprises a cylinder 71 having a piston bore 72. One end of the cylinder 71 is open and secured over this open end is a cup shaped pressure head 73. A piston 74 is mounted to slide in the bore 72 and is rigidly connected to one end of a piston rod 75 which extends through a suitable bore in pressure head 73 and a packing 76 secured to said head.

The pilot piston 74 comprises two pressure heads 77 and 78 which are spaced apart and integrally connected, and between these heads is a chamber 79 which is in constant communication with the atmosphere through a communication or port 84 provided in the piston rod 75. At the opposite side of pressure head 77 is a pressure chamber 80, and a suitable packing cup 81 is secured to said pressure head for preventing leakage of fluid under pressure from said chamber to chamber 79. The pressure head 78 has at its opposite face a pressure chamber 82 and is provided with a packing cup 83 arranged to prevent leakage from said chamber to the atmospheric chamber 79.

Two stops 85 and 86 are slidably mounted on the piston rod 75 in chamber 82. One end of stop 85 is arranged to engage the piston head 78 and at its opposite end is an annular outturned flange 87 arranged to cooperate with an annular shoulder 87a provided in cylinder 71 to limit movement thereof in the direction of the right-hand. The stop 86 is provided with an annular interned shoulder 88 at one end arranged to cooperate with a shoulder 88a on the piston rod 75 for moving said stop in the direction of the right-hand upon corresponding movement of the piston rod 75 from the position shown. The opposite end of stop 86 is arranged to engage the closed end of pressure head 73 to limit movement of the stop in the direction of the left-hand. A coil spring 89, under initial compression and encircling the piston rod 75, bears at one end against the stop 85 and at the opposite end against stop 86.

From the above description it will be seen that in case of movement of the piston rod 75 and piston 74 in the direction of the right-hand, the stop 86 and engaged end of spring 89 will move with said rod, but the stop 85 will remain stationary and such movement of the piston 74 will therefore be opposed by spring 89 and limited by contact between the stop 86 and a ring 90 clamped between the cylinder 71 and pressure head 73. Upon movement of the piston rod 75 and piston 74 in the direction of the left-hand, the stop 86 will remain stationary while the stop 85 will move with said piston so that the spring 89 will opposite this movement and the movement will be limited by engagement of stop 85 with ring 90. Engagement between shoulder 88 on stop 86 and shoulder 88a on piston rod 75.

and between the shoulder 87 on stop 85 and shoulder 87a in cylinder 71 acts to limit expansion of spring 89 upon movement of piston 74 in either direction toward the neutral position shown so as to thereby define said position.

The outer end of piston rod 75 is connected to a cross-head 91 which is mounted to slide in a slot provided intermediate the ends and extending longitudinally of a lever 92. One end of this lever is pivotally connected by a pin 93 to nut 22 on the end of the master piston rod 19, while its opposite end is connected by a pin 94 to one end of a member 95, the opposite end of which member is adjustably connected by screw-threads to one end of a reach rod 96. The opposite end of rod 96 is adjustably connected by screw-threads to one end of a member 97 the opposite end of which is connected by a pin 98 to the end of lever 39 projecting through slot 40 in cover 38 of the controller 35. Locking nuts 99 are provided on the reach rod 96 for contact with the members 95 and 97 in order to provide a rigid connection between the lever 92 at one end of the reach rod and lever 39 at the opposite end.

The fuel supply control device 8 comprises a casing containing a movable abutment 100 which may be in the form of a piston slidably mounted in the casing and connected to one end of a rod 101. This rod extends through a chamber 103 at one side of piston 100 and through the end of the casing and its outer end is arranged for connection in any suitable manner, as by pin 102, to the lever 5 of the fuel control device 4. The chamber 103 is open to the atmosphere through clearance space (not shown) provided between the rod and the bore in the end of the casing through which it extends, and said chamber contains a spring 104 acting on the piston urging it to the position shown. At the opposite side of piston 100 is a chamber 105 which is connected to a pipe 106 through which fluid under pressure may flow to said chamber for adjusting the position of piston 100 in said chamber and thereby the position of the fuel control lever 5 in accordance with the degree of pressure of fluid supplied to the chamber and the opposing pressure of spring 104.

When the chamber 105 is vented, the piston 100 and fuel supply control arm 5 are arranged to occupy the position shown providing for idling of the engine. When a certain maximum degree of fluid pressure is provided in chamber 105, a shoulder 107 on the piston rod is arranged to cooperate with the end of the casing for limiting movement of the piston 100 and thereby of the fuel control arm 5 to that indicated by the dash line 6 which provides for full output or speed of the engine. The arm 5 may be adjusted to any position intermediate idling position and that indicated by the dash line 6 by providing the proper degree of fluid pressure in the piston chamber 105, as will be apparent.

The manual controller 9 is provided to selectively supply or release fluid under pressure to or from clutch control pipes 110 and 111 leading to chambers 82 and 80, respectively, at opposite sides of piston 74 in the pilot device 70. The controller 9 is also provided to vary the pressure of fluid in pipe 106 and thereby in the pressure chamber 105 in the fuel supply control device 8 to provide various chosen degrees of speed or power output of the engine, and to also effect venting of fluid under pressure from said pipe and chamber to provide for operation of the engine at idling speed, prior to disengaging the clutch and until after the clutch is engaged by operation of the clutch control device 7. To accomplish these results, the manual controller 9 may be of any suitable structure such for example as similar to that disclosed in the copending application of Rankin J. Bush and William H. Glass, Serial No. 400,266, filed June 28, 1941, now Patent No. 2,329,742, issued September 21, 1943. In view of this and also with a view to simplicity in the present application only a sufficient showing of the manual controller 9 is therefore made in Figs. 1, 3, and 4, of the drawings to provide a clear and comprehensive understanding of the invention when taken with the following description.

The manual controller 9 may comprise a base or body portion 112 best shown in Fig. 3 containing four valve devices 113, 114, 115, and 116 as best shown in Fig. 1 spaced ninety degrees apart around a circle. Pivotally mounted in the body portion at the center of this circle is an operating lever 117 capable of movement toward and away from each of said valve devices.

The valve device 114 is provided for causing engagement of the clutch to propel the craft in a forwardly direction while the valve device 113 is provided for effecting engagement of the clutch to propel the craft in the reverse direction. These valve devices are therefore preferably located in the body portion 112 of the manual controller diametrically opposite each other with the valve device 114 in the right-hand side of the body portion, as viewed in Fig. 1, which side may be assumed to be facing the front of the craft, while the valve device 113 is therefore disposed in the side of the body facing the stern of the craft. Each of the valve devices 113 and 114 may be identical in structure with the valve devices 41 and 42 employed in the controller 35. For operating the valve devices 113 and 114 two oppositely disposed levers 125 and 126 (Fig. 3) are pivoted in the base 112. The lever 125 is arranged for controlling the valve device 113 and has an adjusting screw 127 in one end thereof for engaging the plunger 52 of the valve device, while the lever 126 is provided for controlling the valve device 114 and has an adjusting screw 128 in one end for engaging the plunger 52 of the valve device 114. The opposite ends of the two levers 125 and 126 are arranged to engage opposite portions of a frusto-conical shaped cam 129 which is provided on the lever 117. This cam is so arranged that movement of the lever in the direction of either of the valve devices will depress the plunger 52 of that valve device to close the release valve 45 and open the supply valve 43 therein. When one of the valve devices 113, 114 is thus operated to open its supply valve 43 the other valve device remains in the condition with its release valve 45 open. The adjusting screws 127 and 128 are so regulated that the release valves 45 in both of the valve devices 113 and 114 are open when the lever 117 is in its neutral position shown in Fig. 3.

The valve device 115 is provided for varying the pressure of fluid in chamber 105 of the fuel control device 7, after the valve device 113 has been operated to cause movement of the craft in reverse, while the valve device 116 is provided for varying the pressure of fluid in chamber 105 after the valve device 114 has been operated to cause movement of the craft in a forwardly direction.

Both of the valve devices 115 and 116 may be of a structure like that shown in Fig. 4 which is identical to that shown in Fig. 2 except that two telescopically arranged plungers 131 and 132 are used in place of plungers 51 and 52, and a control spring 130 is interposed between and connects the plungers 131 and 132. The body portion 112 of the controller carries a lever 133 (Fig. 4) for operating the plunger 131 of each of the valve devices 115 and 116. These levers 133 (only one of which is shown) may be like the levers 125 and 126 which are provided for operating the valve devices 113 and 114 in that in one end of each is an adjusting screw 134 provided for engaging the respective plunger 131, while the opposite end of the lever is arranged for operation by cam 129 provided on the operating lever 117.

Movement of the lever 117 in the direction of either of the valve devices 115 or 116 will, as will be apparent, move the plunger 131 in the valve device in a downwardly direction, as viewed in Fig. 4. This movement of plunger 131 will act to increase the pressure of spring 130 on the plunger 132 and therefore cause movement of the latter into contact with the release valve 45. Further movement of the plunger 132 under the action of spring 130 will then cause opening of the supply valve 43 in order to permit flow of fluid under pressure from a supply pipe 135 (Fig. 4) past the supply valve 43 to chamber 46 from which, in the valve device 115, it will flow to pipe 118, and from which, in the valve device 116, it will flow to pipe 119. Fluid under pressure will thus be supplied past the supply valve 43 to chamber 46 in either of the valve devices 115 or 116 until the pressure in said chamber acting on the plunger 132 is increased sufficiently to overcome the opposing adjusted pressure of spring 130 at which time the plunger 132 will be moved upwardly relative to the plunger 131 to a position in which the supply valve 43 becomes seated to prevent further flow of fluid under pressure to chamber 46.

If the lever 117 is moved further in the direction of the valve device 115 or 116, a corresponding further increase in downward movement of plunger 131 and in pressure of spring 130 is effected in the respective device to cause operation of plunger 132 to again open the supply valve 43 for increasing the pressure of fluid in chamber 46 in accordance with the new position of the plunger 131 and lever 117.

Movement of lever 117 in a direction away from the valve device 115 or 116 back toward its normal position shown permits movement of the plunger 131 in the valve device in a direction away from the plunger 132 to thereby reduce the pressure of spring 130 on the plunger 132. As a result, the pressure of fluid in chamber 46 will move the plunger 132 in an upwardly direction and away from the release valve 45, so that fluid under pressure in chamber 46 will be released past the release valve 45. If the lever 117 is returned fully to its normal position, the pressure of spring 130 in valve device 115 or 116 will be reduced to such an extent that a complete release of fluid under pressure from chamber 46 will occur. However, in case the lever 117 is only partially returned toward its normal position, fluid will be released from chamber 46 only until the pressure of such fluid becomes reduced to a degree sufficient for the spring 130 to move the plunger 132 back into engagement with the release valve 45 so as to thereby hold in chamber 46 a pressure corresponding to the position of the lever 117.

From the above description it will be seen that with the lever 117 in its normal or neutral, vertical position as shown in Figs. 1 and 3, both valve devices 115 and 116 will be effective to cause a complete release of fluid under pressure from the connected pipes 118 and 119, respectively. Movement of the lever 117 out of its normal position toward the top of the drawing, as viewed in Fig. 1, will cause operation of the valve device 116 to provide fluid in pipe 119 at a pressure depending upon the position of the lever away from normal position, while the valve device 115 will act to maintain the pipe 118 open to the atmosphere. On the other hand movement of the lever 117 out of normal position toward the lower portion of the manual controller, as viewed in Fig. 1, will cause operation of the valve device 115 to provide fluid in pipe 118 at a pressure corresponding to the position of the lever out of normal position, while the valve device 116 will maintain the pipe 119 open to the atmosphere.

A cover 121 is secured to the top of the base or body portion 112 and is provided with a slot 122 through which the lever 117 extends to the exterior of the cover. This slot is located intermediate the valve devices 115 and 116 and extends generally in the direction of the valve devices 114 and 113 and thus in the direction fore and aft of the craft. The right-hand end of slot 122 is open to one end of a slot 123 extending in the general direction of the valve device 116 while the left-hand end of slot 122 is open to one end of a slot 124 extending in the general direction of valve device 115. These slots act to define the path of movement of lever 117 and it will be seen that the slot 122 acts to maintain the lever against movement in the direction of valve devices 115 and 116 in order that said valve devices will maintain the pipes 118 and 119 open to the atmosphere. Movement of the lever 117 in slot 122 in the direction of the right-hand end of the slot will effect operation of the valve device 114 while movement to the opposite end of the slot will effect operation of the valve device 113. After the lever 117 has attained the position at the right-hand of slot 122 for causing operation of valve device 114, it may then be moved into slot 123 to actuate the valve device 116 for supplying fluid under pressure to pipe 119. Likewise, after the lever 117 has attained a position at the left-hand end of slot 122, it may be moved into the slot 124 to actuate the valve device 115 for supplying fluid under pressure to the pipe 118.

The slot 122 is shown in the drawing as extending parallel to the length of the craft while the slots 123 and 124 are shown as being at right angles to slot 122. This structure is merely illustrative since, if desired, the slot 122 may be arranged at an angle to that shown in order to facilitate movement of the lever between slot 122 and slots 123 and 124, so long as the degree of angularity is not sufficient to cause operation of either of the valve devices 115 or 116 at the ends of the slot 122 to supply fluid under pressure to their respective pipes 118 or 119.

The cut-off valve device 10 comprises two oppositely seating valves 140 and 141 both of which are contained in a chamber 142 which is connected to the pipe 62 leading to the controller 35. The valve 140 is provided for controlling communication between chamber 142 and a chamber 143 which is constantly supplied with fluid under pressure by way of a pipe 144. The valve 141 is arranged to control communication between chamber 142 and a cavity or bore 145 which is open to the atmosphere through a plurality of ports 146.

The cut-off valve device 10 further comprises a movable abutment preferably in the form of a flexible diaphragm 147 arranged in coaxial relation with the valves 140 and 141 and having at one side a pressure chamber 148 which is open to a pipe 149 leading to the pilot cylinder 71 and opening to the interior thereof at a point preferably midway between the piston heads 77 and 78 when in their neutral position shown. The opposite side of diaphragm 147 engages a follower 150 which has a stem 151, the end of which stem is slidably mounted in bore 145 for engagement with the stem of valve 141. An adjusting nut 152 encircling the stem 151 has screw-threaded engagement with the casing of the device and supports one end of a control spring 153, the opposite end of which spring acts on the follower 150. A lock nut 154 provided on the adjusting nut 152 is arranged for contact with the casing for securing the adjusting nut in a desired position.

Deflection of the diaphragm 147 in a downwardly direction, in response to the pressure of fluid supplied to chamber 148 to a degree exceeding the opposing pressure of spring 153, will unseat the valve 141 and seat the valve 140, while upon the release of fluid pressure from chamber 148 spring 153 acts to return the diaphragm 147 to its normal position shown, under which latter condition spring 330 in chamber 143 will unseat the valve 140 and seat the valve 141.

The interlock valve device 11 comprises a casing containing two oppositely seating coaxially arranged valves 157 and 158 having fluted stems which extend through suitable bores and engage each other in a chamber 159 to which the pipe 106 is connected. The valve 157 is contained in a chamber 160 connected to a pipe 120 and is provided for controlling communication between this pipe and pipe 106. The valve 158 is contained in a bore 161 which is in constant communication with the atmosphere through a port 162 and is arranged to control communication between this bore and chamber 159. A spring 163 in chamber 60 acts on the valve 157 for seating same and unseating the valve 158.

The interlock valve device 11 further comprises a piston 164 having at one side a stem 165 slidably mounted in the bore 161. This stem extends through a chamber 166 which is in constant communication with bore 161 through a port 167 in the stem, and a spring 168 encircling the stem 165 in chamber 166 acts on the piston 164 for urging it to its normal position shown. The piston 164 is operatively connected to the valve 158 by a spring 169 interposed between said valve and the bottom of a bore in stem 165. At the opposite side of piston 164 is a chamber 170 which is connected to pipe 149.

A check valve device 171 is provided in pipe 106 between the interlock valve device 11 and the fuel supply control device 8 to permit a relatively rapid flow of fluid under pressure from chamber 105 in the fuel supply control device 8 in the direction of the interlock valve device 11 but to prevent flow therethrough in the opposite direction. A communication including a choke 172 by-passes the check valve device 171 in order to permit a restricted or relatively slow flow of fluid under pressure from the interlock valve device 11 to chamber 105 in the fuel supply control device 8.

*Operation—Figs. 1 to 4*

In operation, let it be initially assumed that lever 117 in the manual controller 9 is in the "Neutral" or vertical position as shown in Figs. 1 and 3. With the lever in this position, the several valve devices 113, 114, 115 and 116 will be conditioned to open the pipes 111, 110, 118, and 119, respectively, to the atmosphere. The chambers 80 and 82 at the opposite sides of the pilot piston 74 will thus be at atmospheric pressure and as result of this spring 89 acting on said piston will hold the piston in its neutral position as shown. While the pilot piston 74 occupies its neutral position, the parts of the controller 35 and the clutch control piston 18 in the cylinder 15 will occupy their normal or neutral positions as shown, as will be clear from the description of operation to follow. With the piston 18 in its neutral position, the clutch control lever 3 will also be in its "Neutral" position, thus disconnecting the engine on the craft from the propeller.

With the pilot piston 74 in its neutral position, diaphragm chamber 148 in the cut-off valve device 10 and piston chamber 170 in the interlock valve device 11 will both be open to the atmosphere through chamber 79 formed between the two piston heads 77 and 78 of the pilot piston and bore 84 in the pilot piston rod 75. As a result, spring 153 in the cut-off valve device will act to maintain the diaphragm 147, follower 150, and stem 151 in their upper positions as shown, under which condition the valve 141 will be seated and the valve 140 will be unseated by spring 330, so that fluid under pressure will be supplied from any suitable source by way of pipe 144 to the valve chamber 142 and thence through pipe 62 to chamber 61 in the controller 35 (Fig. 2) and from said chamber through passage 60 to the supply valve chamber 44 in each of the valve devices 41 and 42. With the lever 39 of controller 35 in its neutral position as shown, however, the supply valve 43 in both of the valve devices 41 and 42 will be seated to prevent flow of fluid under pressure out of chamber 44, and the release valve 45 in both of said devices will be unseated as above described, so that the chambers 21 and 30 at opposite sides of the clutch control piston 18 will both be open to the atmosphere.

With piston chamber 170 in the interlock valve device 11 open to the atmosphere, spring 168 will hold the piston 164 in the position shown under which condition spring 163 will hold the valve 157 seated and the valve 158 unseated. With the valve 158 unseated, chamber 105 in the fuel supply control device 8 will be open to the atmosphere through pipe 106 by way of check valve 171, past the valve 158 and through bore 161 and port 162. Under this condition spring 104 acting on fuel supply control piston 100 will hold said piston in the position shown, so that the arm 5 of the fuel supply control device will be in its idling position as shown to provide for operation of the engine at idling speed.

Now let it be assumed that it is desired to propel the craft forwardly. To accomplish this, the operator will move the lever 117 from its "Neutral" position in which it is shown to the right hand end of slot 122, this movement being toward the front of the craft or in the direction of desired movement. This movement of lever 117 will not change the condition of the valve device 113 as a result of which the pipe 111 will be maintained open to the atmosphere through said valve device. The valve device 114 will be operated, however, to supply fluid under pressure through pipe 110 to chamber 82 at one side of the pilot piston 74. Since chamber 80 at the opposite side of the pilot piston 74 is open to the atmosphere at this time by way of pipe 111, the pressure of fluid thus attained in chamber 82 and acting on piston 74 will move the piston in the direction of the right-hand.

The resistance to movement of the clutch control piston 18 is sufficiently great to hold the connected end of the lever 92 substantially fixed upon movement of the pilot piston 74 by fluid supplied to chamber 82 as just described, and as a result said lever will be rocked about the fulcrum pin 93 in a clockwise direction and thereby shift the reach rod 96 in the direction of the right-hand. This movement of rod 96 will rock lever 39 in the controller 35 in a clockwise direction into engagement with stop 64 provided at the right-hand end of slot 40. Only a slight movement of the pilot piston 74 from its neutral position relative to the clutch control piston 18 is required to move the controller lever 39 into engagement with the right-hand end of slot 40 after which further movement of the pilot piston 74 is dependent upon movement of the clutch control piston 18, as will now be described.

When the lever 39 is rocked into contact with stop 64 at the right-hand end of slot 40, the valve device 41 will maintain chamber 30 at the right-hand side of the clutch control piston 18 open to the atmosphere by way of pipe 32 and past the exhaust valve 45 in said device, while the valve device 42 will be operated to close the release communication to chamber 21 at the left-hand side of the clutch control piston 18 and to supply fluid under pressure thereto.

When the pressure of fluid thus supplied to chamber 21 becomes increased to a sufficient degree, said pressure acting on the clutch control piston 18 will move the piston and thereby the piston rod 19 in the direction of the right-hand which in turn will rock the clutch control lever 3 in a clockwise direction from "Neutral" position toward "Forward" position. At the same time, the fulcrum pin 93 in the lower end of lever 92 moves with rod 19 so that the lever 92 will rock in a counterclockwise direction about the fulcrum connection at pin 94 with rod 96 which connection is maintained fixed at this time by the pressure of fluid in chamber 82 acting on the pilot piston 74, but the pilot piston will move with the clutch control piston 18 upon this rocking of lever 92.

Thus after the initial movement of pilot piston 74 relative to the clutch control piston 18, further movement of the pilot piston will occur only with the piston 18 and the pilot piston will maintain the lever 39 in its right-hand position to continue supply of fluid under pressure to chamber 21 and thereby movement of the clutch control piston 18 toward the right hand.

The clutch control piston 18 will continue to move in the direction of the right-hand under the action of fluid pressure in chamber 21 and corresponding movement of the pilot piston will continue until stop 86 on the pilot piston rod 84 moves into contact with stop ring 90 which stops the pilot piston against further movement. At this time the clutch control piston 18 will be substantially in the forward position for a new clutch and still subject to fluid pressure in chamber 30.

When the pilot piston 74 is stopped by ring 90 the pipe 149 will be opened past the packing cup 83 carried by the piston head 78 to chamber 82.

Fluid under pressure will then flow from chamber 82 through pipe 149 to diaphragm chamber 148 in the cut-off valve device 10 and when sufficient pressure is attained in chamber 148 to overcome the opposing pressure of control spring 153, the diaphragm 147 will be deflected downwardly to open valve 141 and close valve 140.

This closing of valve 140 will cut off the supply of fluid under pressure to pipe 62 and thus through the valve device 42 in controller 35 to chamber 21 in the cylinder 15, while the opening of valve 141 in the cut-off valve device will vent fluid under pressure from said chamber past the supply valve 43 in the valve device 42 and thence to atmosphere past the valve 141. This release of fluid under pressure from chamber 21 on the clutch control piston 18 after the clutch arm 3 attains its "Forward" position will relieve said arm and thus the thrust bearings as well as other parts of the clutch of the force used for moving the clutch to its forward position, so as to prevent undue wear of such parts.

With the clutch in a new and proper condition, the cut-off valve device 10 may operate to release the fluid under pressure from piston chamber 21, as just described, substantially at the time of or immediately following the opening of pipe 149 to chamber 82. Wear of the clutch may however require a greater extent of movement of piston 18 and clutch operating arm 3 as before described and as will be seen by the legends applied to Fig. 1. Also, undue resistance to movement of a clutch part from its neutral position to forward position, or different degrees of movement of the clutch arm 3 required for moving the driven parts of different clutches from their neutral position to their forward position may also require the maintenance of pressure on piston 18 for a period of time after the pilot piston 74 obtains the position for opening pipe 149 to chamber 82.

In order to insure adequate movement of the clutch control piston 18 to meet conditions such as just set forth, the pressure of spring 153 on diaphragm 147 in the cut-off valve device 10 may be so adjusted by nut 152 as to require a greater pressure of fluid in chamber 148 on said diaphragm for closing valve 149 and opening valve 141 than acting in chamber 82 at the time chamber 82 is opened to pipe 149. This greater pressure will be obtained from the manual controller 9 at the end of a delay period following the opening of chamber 82 to pipe 149 by the pilot piston 74. During this delay period, which is dependent upon the adjusted pressure of spring 153, the pressure of fluid in chamber 21 will remain effective on the clutch control piston 18 to insure a sufficient continued effort or movement thereof relative to the pilot piston 74 for proper positioning of the arm 3 and clutch parts in the forward position. The adjustability of spring 153 therefore provides for the adjustment or conditioning of the apparatus to any particular clutch or clutch condition such as above described.

In Fig. 5 is shown another structure arranged to insure adequate movement of the clutch control arm 3 and piston 18, after the pilot piston 74 stops moving, in order to properly position said arm and connected clutch part. According to this modification, a timing chamber 172 is connected to the diaphragm chamber 148 and is also connected to pipe 149 through a check valve 173 and a choke 174 arranged in a communication by-passing the check valve. The check valve 173 is arranged to prevent flow of fluid in the direction from pipe 149 to chamber 172 but to allow relatively rapid flow in the opposite direction, while the choke 174 is arranged to limit or restrict the rate of flow of fluid under pressure from pipe 149 into chamber 172 and diaphragm chamber 148. By this arrangement there will be a delay between the opening of pipe 149 to chamber 82 at one side of the pilot piston 74 and the operation of diaphragm 147 in the cut-off valve device to close the supply valve 140 and open the release valve 141, during which delay the piston 18 may continue to be effective to ensure desired positioning of the clutch control lever 3. It should be noted, however, that this delay need not be dependent upon a continued increase in pressure in chamber 82 after the pilot piston 74 connects said chamber to pipe 149 like the structure in Fig. 1, but instead is governed by the flow capacity of choke 173 with respect to the combined volumes of the timing chamber 172 and diaphragm chamber 148 and the adjusted pressure of spring 153 on the diaphragm 147, since, as will be apparent, the choke will retard the build-up in pressure on the diaphragm 147 to the degree required to overcome the opposing pressure of the spring 153. The length of this delay period may be varied by a suitable adjustment of spring 153 on the diaphragm 147, since a greater pressure of said spring will require a higher fluid pressure in chamber 148 on the diaphragm to overcome the spring that is required to overcome a lower pressure of the spring, and it follows that a longer period of time will therefore be required to attain this higher fluid pressure on the diaphragm than the lower fluid pressure. By proper adjustment of the pressure of spring 153, an adequate continued movement of the clutch control piston 18 may therefore be assured after the pilot piston 74 opens pipe 149 to chamber 82 to insure movement of the clutch arm 3 to "Forward" position regardless of the wear condition of the clutch or any other condition which may act to delay or oppose the desired positioning of the clutch arm 3.

With the structure shown in Fig. 5 the operation of the cut-off valve device 10 to cut-off the supply of fluid under pressure to the controller 35 and piston chamber 21 may of course occur at a pressure higher than the one acting on piston 74 at the time pipe 149 is opened to chamber 82, like the structure shown in Fig. 1, but if desired, the structure may be designed to so operate even before the pressure in diaphragm chamber 148 is built up to that acting in chamber 82 on the pilot piston, since, as above pointed out, the delayed operation of the cut-off valve device 10 need not be dependent upon any certain degree of pressure in chamber 82 on the pilot piston 74, like the structure shown in Fig. 1.

From the above description it will be noted that the cut-off valve device 10 may operate to cut-off the supply of fluid under pressure to chamber 21 and vent said chamber immediately following or at the termination of some chosen time interval after, the opening of pipe 149 to chamber 82.

In an installation where the cut-off valve device 11 operates substantially at the time that pipe 149 is opened to chamber 82, it is essential that the clutch control piston 18 will have moved the clutch lever 3 to its "Forward" position and this is attained by limiting rocking movement of the controller lever 39, in any desired manner as by the stop 64 at the right-hand end of slot 40, to such a degree as to just cause opening of the supply valve 43 in the valve device 42. Further movement of the pilot piston toward the position for opening chamber 82 to pipe 149 will then take place only as the clutch control piston 18 moves as above described, and it has been found that by the proper restricting of movement of lever 39, the opening of chamber 82 to pipe 149 can be delayed until the clutch control piston 18 substantially attains the desired clutch engaging position. In other words, positive positioning of the clutch control piston 18 is obtained by so limiting the initial movement of the pilot piston 74 relative to the clutch control piston that the clutch control piston closely follows the pilot piston and substantially attains the desired clutch position by the time the pilot piston attains the position for supplying fluid under pressure to the cut-off valve device.

After the pilot piston 74 is stopped in its right-hand position, continued movement of the clutch control piston 18 will rock the lever 92 in a counterclockwise direction about its fulcrum connection with the pilot piston rod 84 and thus operate the reach rod 96 to rock the controller lever 39 in the same direction and away from the stop 64 at the right-hand end of slot 40. This movement of lever 39 will continue until the piston 18 stops, but for the maximum movement of piston 18 toward the right end of cylinder 15 such movement of lever 39 will only be slight and not sufficient to operate lever 39 to a position in which the supply valve 43 in the valve device 42 will be closed. In other words, the supply valve 43 in the valve device 42 will remain open under the most extreme conditions of movement of the piston 18 in order that the cut-off valve device 11 may operate to release fluid under pressure from chamber 21, as above described.

At the time the operator moves the lever 117 in the slot 122 to the right-hand end thereof or toward the front of the craft, he may either allow the handle to remain in that position until after the clutch has been engaged, as above described, or he may continue movement into the slot 123 to any position he may desire. In case the handle 117 is left at the right hand end of slot 122 until after the clutch has been engaged he will then move it into the slot 123 to a desired position.

Movement of the lever 117 into the slot 123 will cause operation of the valve device 116 to supply fluid to pipe 119 at a pressure depending upon the extent of movement of the lever into the slot 123, that is to say, in a direction away from the juncture of the slots 122 and 123. Fluid thus supplied to pipe 119 will flow to the double check valve device 12 and therein acts on one end of a double check valve 175, the opposite end of which is open to the atmosphere at this time by way of pipe 118 and valve device 115. As a result, the double check valve 175 will be shifted by pressure of fluid from pipe 119 to the position shown in the drawing for closing communication between pipes 120 and 118 and for opening pipe 120 to pipe 119. Fluid at the pressure supplied to pipe 119 will then flow through pipe 120 into valve chamber 160 of the interlock valve device 11.

Chamber 170 below piston 164 in the interlock valve device 11 will be vented to the atmosphere by way of pipe 149 and chamber 79 between the pilot piston heads 77 and 78 until the pilot piston 74 operates to supply fluid under pressure to the cut-off valve device 10. Fluid pressure thus supplied to pipe 149 for operating the cut-off valve device 10, as above described, will at the same time flow into chamber 170 and therein act on piston 164 to move same against spring 168 and into contact with a seal 176. This movement of piston 164 acts through the spring 169 to seat the valve 158 for closing communication between chamber 105 in the fuel supply control device 8 and the atmospheric port 162. At the same time as valve 158 is seated the valve 157 is unseated whereupon fluid supplied to chamber 160 by operation of the valve device 118 in the manual controller 9 will flow to pipe 106 and through the restriction 172 therein to piston chamber 105 at one side of piston 100 in the fuel supply control device 8.

When the pressure of fluid thus attained in chamber 105 is increased to a degree sufficient to overcome the opposing pressure of spring 104 the piston 100 will move in the direction of the left-hand to a position depending upon the pressure of fluid supplied to the chamber 105, as determined by the position of the operating lever 117 in the slot 123 and the consequent operation of valve device 118. This movement of piston 100 acts to rock lever 5 of the fuel supply control device out of idling position in the direction of the full speed position, indicated by dash line 6, to a position depending upon the pressure of fluid supplied to the chamber 105. If the hand lever 117 is moved into engagement with the end of slot 123 most remote from slot 122, the shoulder 107 on the piston rod 101 will move into contact with the end of the casing and lever 5 will be moved to the full speed position indicated by the dash line 6, but for all lesser degrees of movement of the lever 117 into slot 123 away from slot 122 the piston 100 and lever will be correspondingly positioned.

It will now be seen that regardless of the position of lever 117 in slot 123 the piston 100 controlling the position of the fuel control lever 5 will remain in the position providing for operation of the engine at idling speed so long as the interlock valve device 11 remains in the position in which it is shown or until after the pilot piston 74 obtains the position for opening chamber 82 to pipe 149, at which time, the clutch will be substantially if not fully engaged in the forward position. In other words, the interlock valve device 11 insures that the fuel supply control lever 5 will remain in idling position so as to provide for operation of the engine at idling speed until after the clutch arm 3 has been moved to its "Forward" position, following which the interlock valve device will operate to permit adjustment of the fuel control supply lever 5 to accelerate the engine in accordance with the extent of movement of lever 117 into slot 123.

The choke 172 in pipe 106 is provided to so limit the rate of flow of fluid under pressure into chamber 105 as to prevent sudden movement of piston 100 and the fuel supply control lever 5 and consequently an excessive rate of acceleration of the engine from idling speed to the speed called for by the position of lever 117, and to also delay or retard acceleration of the engine until the clutch is substantially engaged under a condition requiring maximum movement of the piston 18.

With the apparatus conditioned as above described, a craft will be moved in a forwardly direction at a speed dependent upon the position of lever 117 in the slot 123.

If the operator now desires to stop the craft or to disconnect the engine from the propeller, he moves the lever 117 out of slot 123 into slot 122 and thence back to its "Neutral" position shown in Figs. 1 and 3. As the lever 117 is thus moved out of the slot 123, the valve device 118 in the manual controller 9 operates to release fluid under pressure from pipe 119 and thereby from piston chamber 105 in the fuel supply control device 8. This release of fluid under pressure from piston chamber 105 is allowed to occur rapidly through check valve 171 in the pipe 106 in order that spring 104 will promptly return the piston 100 and the fuel supply control lever 5 to the engine idling position shown in the drawing to effect a reduction in the speed of the engine to idling speed.

When the lever 117 is returned through slot 122 to its "Neutral" position, the valve device 114 in the manual controller 9 will operate to completely vent fluid under pressure from pipe 110 and thereby chamber 82 at one side of the pilot piston 74. Upon this reduction in pressure on the pilot piston, the pressure of spring 89 on follower 86 applied to the pilot piston rod 75 through shoulder 88 will return the pilot piston from its right-hand position back in the direction of neutral position and at the same time will rock the lever 92 about the fulcrum pin 93 carried by the clutch control piston rod 19 to thereby actuate the reach rod 96 to pull the lever 39 from the right-hand end of slot 40 into engagement with shoulder 64 at the left-hand end. This engagement limits the initial movement of the pilot piston 74 under the action of spring 89 but provides such operation of the control lever 39 as to effect operation of the valve device 42 in the controller 35 to connect chamber 21 at the left-hand side of the clutch control piston 18 to the atmosphere by way of pipe 31, and at the same time the valve device 41 in said controller is actuated to establish communication between the fluid pressure supply pipe 62 and pipe 32 leading to chamber 30 at the right-hand side of the clutch control piston 18.

With the pilot piston 74 in its extreme right-hand or forward position the pipe 149 is open to chamber 82 as above described. As a result of this, the pressure of fluid in pipe 149 and thereby in chamber 170 of the interlock valve device 10 and in chamber 148 of the cut-off valve device 9 will reduce with that in chamber 82 by way of pipe 110 and valve device 114 in the manual controller 9, until the pilot piston 74 moves to pull the lever 39 into contact with stop 40 at the left-hand end of slot 40. When this occurs the pilot piston 74 will close communication between pipe 149 and chamber 82 and open said pipe to chamber 79 between the two piston heads 77 and 78 so that further release of fluid under pressure from chamber 170 and 148 in the interlock and cut-off valve devices will then occur through chamber 79 and bore 84 in the piston rod 75 to the atmosphere. With the structure shown in Fig. 5, this reduction in pressure in diaphragm chamber 148 will occur past the check valve 173 as will be apparent.

When the pressure of fluid in chamber 170 of the interlock valve device is thus reduced sufficiently, spring 168 will act to return the piston 164 to its normal position shown, whereupon spring 163 will seat the supply valve 157 and unseat valve 158 so as to open pipe 106, connected with the fuel control device 9, to the atmosphere, to thereby insure complete venting of chamber 106 by way of check valve 171 and, as a result, movement of the fuel device control lever 5 to its engine idling position.

When the pressure of fluid in diaphragm chamber 148 of the cut-off valve device 10 is reduced sufficiently as above described, spring 153 will return said diaphragm to its normal position shown, whereupon spring 145 will unseat the valve 140 and seat the valve 141. With the valve 140 thus unseated, fluid under pressure will be supplied from the supply pipe 144 to pipe 62, so that with pipe 62 open to pipe 32 by way of the valve device 41 in the controller 35, as above described, fluid under pressure will flow to chamber 30 at the right-hand side of the clutch control piston 18 for moving same in the direction of the left-hand to thereby move the clutch control lever 3 from its "Forward" position back toward "Neutral" position.

As the piston 18 is thus urged in the direction of the left-hand, a corresponding movement of the lower end of lever 92 will occur to allow spring 89 to return the pilot piston 74 toward its neutral position while maintaining the upper end of lever 92 in the condition holding lever 39 against stop 64 at the left-hand end of slot 40.

Movement of the pilot piston 74 along with the main piston 18 in the direction of the left hand as just described will cease in neutral position due to the stop 86 on the piston stem 75 engaging the closed end of cylinder 73 to relieve said piston of the force of said spring and also due to the fact that chambers 82 and 80 at the opposite sides of the pilot piston will both be substantially at atmospheric pressure. The clutch control piston 18 following closely the movement of the pilot piston 74 will however continue movement toward the left hand after the pilot piston 74 stops in its neutral position due to the fact that the valve device 41 in the controller 35 will still be supplying fluid under pressure to chamber 30 at the right-hand side of piston. This continued movement of piston 18 will rock the lever 92 in a clockwise direction about its fulcrum connection with the pilot piston rod 75 and thereby actuate the reach rod 96 to move the controller lever 39 back to its neutral position, which position will be attained at substantially the time the clutch control piston 18 attains its neutral position. This return of lever 39 to its neutral position will effect operation of the valve device 41 to release fluid under pressure from chamber 30 to the atmosphere, whereupon movement of the piston 18 will cease substantially in its neutral position with the chambers at both sides of the piston open to the atmosphere. This return of the clutch control piston 18 from adjacent the right-hand end of the cylinder 15 to its neutral position will rock the clutch control lever 3 from its "Forward" position back to its "Neutral" position, as will be apparent.

As above described, the initial venting or start of release of fluid under pressure from chambers 170 and 148 in the interlock and cut-off valve devices 11 and 10 respectively may occur by way of pipe 149 and chamber 82 before the pilot piston 74 starts moving from its right hand position back toward neutral, and then the further and complete venting will occur through said pipe and chamber 79 between the two piston heads 77 and 78 after the pilot piston moves the lever 39 into contact with stop 64 at the left hand end of slot 40. The apparatus may be so arranged that the interlock valve device 11 and cut-off valve device 10 will operate as hereinbefore described in response to either the initial venting of fluid under pressure by way of chamber 82 or the final venting through chamber 79 between the two piston heads, as desired.

If the operator desires now to propel the craft rearwardly, he will move the lever 117 from its "Neutral" position through the slot 122 in the direction of the left-hand, as viewed in Fig. 1, and thereby toward the stern of the craft to the junction of slot 122 with slot 124 and he may then move the lever into the slot 124 to a position for providing a desired engine speed or output. The engine will not however be accelerated at this time due to the interlock valve device 11 opening the fuel control supply chamber 105 to the atmosphere.

When the lever 117 is moved to the left-hand end of slot 122, the valve device 113 in the manual controller 9 will be operated to supply fluid under pressure to pipe 111 through which it will flow to chamber 80 at one side of the pilot piston 74 whereupon the pilot piston will move toward the left-hand to actuate the controller 35 to supply fluid to chamber 30 at the right-hand side of the clutch control piston 18. The clutch control piston 18 will then move in the direction of the left-hand and a corresponding movement of the pilot piston 74 will occur until shoulder 87 on stop 85 engages the stop ring 90 to limit movement of the pilot piston. With the pilot piston in contact with ring 90, pipe 149 will be opened to chamber 80 at the right-hand side of the pilot piston. After this connection is established and the clutch arm 3 obtains its "Reverse" position, the cut-off valve device 10 will operate as above described to cut-off the supply of fluid under pressure to chamber 30 at the right-hand side of the clutch control piston 18 and then vent said chamber to atmosphere to relieve the clutch arm 3 of force, and the power control interlock valve device 11 will also operate to establish communication between pipes 120 and 106.

When the lever 117 is moved into the slot 124, it will cause operation of the valve device 115 to supply fluid to pipe 118 at a pressure depending upon the extent of movement of said lever away from the junction of slot 124 with slot 122. The pressure of fluid thus supplied to pipe 118 will shift the check valve 175 to its lower seated position for closing communication between pipes 120 and 119 and for opening pipe 120 to pipe 118 whereupon fluid supplied to pipe 118 will flow through pipe 120 to the interlock valve device 11. After the valve 157 in the interlock valve device opens, fluid will flow from pipe 120 to the fuel supply control device 8 to adjust the fuel supply control piston 120 and arm 5 to provide for operation of the engine at the desired chosen speed determined by the position of lever 117.

From the above description it will be seen that operation of the apparatus to provide for movement of the craft backwardly is just the reverse of that which provides for movement of the craft forwardly. Also, if it is desired to stop the craft when moving backwardly, the control lever 117 need only be returned to its "Neutral" position shown, whereupon the apparatus will operate in substantially the same manner as hereinbefore described to return the clutch lever 3 to its "Neutral" position for disconnecting the engine from the propeller and for returning the fuel control supply lever 5 to "Idling" position upon or prior to disengagement of the clutch in the same manner as above described.

It is desired to point out that the communicating slots 122, 123, and 124 in the manual controller 9 provide for natural movements of lever 117 to control movement of the craft in accordance with the desired direction of movement and for also controlling the speed of the engine in either direction of movement, for it will be noted that if the operator desires to move the craft forwardly he will move the lever 117 forward in slot 122 on in the direction toward the front of the craft and then to cause acceleration of the engine he will move the lever sidewise into the slot 123, whereas if movement of the craft rearwardly is desired he will pull the lever 117 back through the slot 122 in the direction of desired movement of the craft and then move same to the side into slot 124 for causing the engine to operate at a desired speed.

It will also be seen that the arrangement of slots 122, 123, and 124 insures operation of the clutch valve devices 114 or 113 by lever 117 to effect engagement of the clutch prior to movement of the lever into either of slots 123 or 124 for increasing the engine speed or output, and also, insures operation of the lever 117 to provide for reducing the speed of the engine to idling before actuating the valve devices 114 or 113 to effect disengagement of the clutch. The interlock valve device 11 provides for movement of the lever 117 to a desired position in either slot 123 or 124 before engagement of the clutch so that as soon as the clutch is engaged the output of the engine will automatically be increased to the desired degree. Movement of lever 117 out of either slot 123 or 124 to "Neutral" position insures venting of chamber 105 in the fuel supply device 8, before the interlock valve device 11 operates to effect such venting, in order that the fuel supply control lever 5 will be moved to idling position promptly upon movement of the lever 117 back to "Neutral" position for effecting disengagement of the clutch.

With a craft running either forwardly or in the reverse direction, a condition may arise where the operator desires to suddenly reverse the direction of movement of the craft. Let it be assumed that the craft is moving in a forwardly direction. To suddenly reverse the direction of movement of the craft from forward the operator will merely move the lever 117 out of slot 123 through the full length of slot 122 and he may then move it into the slot 124 to a desired position for providing a desired rate of movement of the craft in reverse after the clutch has been engaged in "Reverse" position of the clutch arm 3. When the lever 117 is moved out of the slot 123, the fuel control device 8 will be conditioned to provide for operation of the engine at idling speed as above mentioned, and movement of the lever through the slot 122 from its right-hand end to its left-hand end will cause venting of fluid under pressure from pipe 110 and at substantially the same time the supply of fluid under pressure to pipe 111. Upon the release of fluid pressure from pipe 110 and chamber 82 at one side of the pilot piston 74 said piston will promptly move and rock the controller lever 39 from right-hand end of slot 40 into engagement with stop 64 at the left-hand end of slot 40, and at the same time fluid under pressure will be vented from pipe 149 to cause movement of the interlock valve device 11 to the position shown for insuring that arm 5 of the fuel supply control device will be moved to and remain in idling position while the clutch is disengaged.

At substantially the same time as the interlock valve device operates, the cut-off valve device 10 will operate to supply fluid under pressure to the pipe 62. With the control lever 39 rocked to its left-hand position fluid supplied to pipe 62 will then flow from said pipe through the valve device 41 to pipe 32 and thence to pressure chamber 30 at the right-hand side of the clutch control piston 18. Chamber 21 at the left-hand side of piston 18 will at this time be open to atmosphere through the valve device 42, so that when a sufficient differential of fluid pressures is attained on the piston 18, said piston will start to move from the adjacent right-hand end of cylinder 15 toward the opposite end.

The pilot piston 74 will move with piston 18 in the same manner as above described but in this instance will not stop in neutral position, due to the fact that chamber 80 at the right-hand face of the pilot piston is subject to pressure of fluid supplied through pipe 111. As a result, the pressure of fluid in chamber 80 on the pilot piston 74 will act to maintain the lever 92 and thereby the reach rod 96 in such position as to hold the controller lever 39 in contact with stop 64 at the left-hand end of the slot 40 so that movement of the clutch piston 18 will be continued by fluid pressure supplied through the valve device 41 to chamber 30, through its neutral position toward its reverse position at the left-hand end of cylinder 15.

The pilot piston 74 will continue movement through its neutral position in the direction of the left-hand end of bore 72 along with the piston 18 in a corresponding direction until shoulder 87 on stop 86 engages the ring 90, at which time the pipe 149 will be opened to chamber 80. After this occurs, fluid under pressure will flow from chamber 80 through pipe 149 to the cut-off valve device 10. The cut-off valve device 10 will then operate as hereinbefore described after the clutch arm 3 has been moved to its "Reverse" position to cut-off the supply of fluid under pressure through pipe 62 to chamber 30 and to then vent said chamber to the atmosphere to thereby relieve the piston 18 of force urging the clutch control lever 3 in the direction of "Reverse" position.

The interlock valve device 11 will also operate upon the supply of fluid under pressure to pipe 149, just described, to connect pipes 106 and 120 so that piston 100 in the fuel supply control device 8 and thereby the fuel supply control lever 5 will be positioned in accordance with the position to which the operator may move lever 117 into the slot 124 in order to attain the desired acceleration or output of the engine after the clutch is engaged in reverse.

From the above description it will be seen that when the operator moves the lever 117 out of slot 123 into slot 122 and through same and into slot 124 the lever 5 of the fuel supply control devices will first be moved to idling position in order to provide a reduction in speed of the engine to idling and then the clutch will be disengaged in its forward position and subsequently engaged in its reverse position following which the interlock valve device 11 will operate to permit acceleration of the engine to a degree desired by the operator as determined by the position of lever 117 in slot 124, the fuel supply control lever 5 being maintained in the idling position during movement of the clutch control lever 3 from "Forward" position to "Reverse" position.

In case the craft is moving in reverse and the operator desires to cause movement in a forwardly direction, he merely moves the lever 117 out of the slot 124 and through the slot 122 in the direction toward the front of the craft and thence into the slot 123 to a desired position. As a result of this operation the fuel supply control lever 5 will first be moved to idling position, the clutch will then be disengaged in reverse position and next engaged in forward position and then the interlock valve device will operate to provide for acceleration of the engine to the degree provided for by the position of lever 117 in slot 123.

It will be noted that the operator can never cause operation of the engine at a speed above idling while the clutch is disengaged, acceleration of the engine being possible only after substantial engagement of the clutch has occurred.

In order to insure full movement of lever 117 from its "Neutral" position to either of its clutch engaging positions at opposite ends of slot 122 the interior top surface of cover 121 secured to the body portion 112 of the manual controller is, as best shown in Fig. 3, in the form of an inverted V as viewed in a plane bisecting the slot 122 lengthwise thereof. A shoe 178 is slidably mounted on the lever 117 within the cover 121 and is urged into contact with this surface by a spring 179. The force with which the shoe 178 is pressed into contact with the interior sloping surface of the cover by spring 179 will automatically move the lever 117 from either end of the slot 122 to the neutral position of the lever when the lever is not subject to manual force. In order to engage the clutch, the operator must therefore move the lever to either one end or the opposite end of the slot 122 against the force between shoe 178 and the interior of the cover due to the action of spring 179 and then hold the lever in this position or else move the lever out of the slot 122 into either of the slots 123 or 124 in order to obtain the desired clutch operation. The interior surface of the cover 121 lengthwise of the slots 123 or 124 is such that when the lever 117 is moved into either of these slots, the force of the shoe 178 against the cover will maintain the lever 117 in any position to which it has been moved. Thus the operator may adjust the lever in either of the slots 123 or 124 to provide a desired engine speed and the lever will remain in the adjusted position when relieved of manual force.

*Description—Figure 6*

If desired, the pilot device 70 may be constructed as shown in Fig. 6. This structure comprises a pilot piston 185 embodying a single pressure head provided with suitable packing, such as a ring 186 for preventing leakage of fluid under pressure from one side of the piston to the opposite side. This piston has a neutral position as shown in the drawing and two extreme positions which may be defined in any suitable manner as by stops 85 and 86 (not shown) but like employed in the pilot device shown in Fig. 1. The piston 185 has at its opposite sides chambers 80 and 82 which are connected respectively to pipes 111 and 110, the same as in the structure shown in Fig. 1. A pipe 187 is connected to the casing at such a point adjacent one end thereof as to be opened to chamber 82 upon movement of the piston 185 to its extreme right hand position and a pipe 188 is connected adjacent the opposite end of the casing at such a point as to be opened to chamber 80 upon movement of piston 185 to its extreme left hand position.

The two pipes 187 and 188 lead to the opposite ends of a double check valve device 189 having a side outlet connected to pipe 149 leading to the cut-off valve device 10 and interlock valve device 11. This check valve device comprises a casing having two chambers 190 and 191 constantly open to pipes 188 and 187, respectively, and connected to each other by a bore 192. A valve 193 is contained in chamber 190, and an oppositely disposed valve 194 is contained in chamber 191 and these valves are connected for movement in unison by a stem 195 of smaller diameter than and extending through the bore 192. When the valves 193 and 194 are in the positions shown, the valve 193 is arranged to close communication between chamber 190 and bore 192 while the valve 194 opens communication between said bore and chamber 191. The valve 194 is arranged for movement in the direction of the left-hand for closing communication between chamber 191 and bore 192 and at the same time the valve 193 will be positioned to open chamber 190 to bore 192.

In practice, when the manual controller 9 is moved to the right-hand end of slot 122 for effecting forward movement of the craft, the fluid pressure supplied to pipe 110 will flow to chamber 82 and act on the piston 185 for effecting movement thereof in the direction of the right-hand end of the casing the same as occurs with the pilot piston 74 shown in Fig. 1 and above described. The fluid pressure thus supplied to chamber 82 will also flow through pipe 188 to chamber 190 in the double check valve device 189 and therein act on valve 193 for seating same and at the same time unseating the valve 194. With the valve 194 unseated, pipe 149 is open to pipe 187 which with piston 185 at the left hand side of pipe 187 is vented to the atmosphere through chamber 80 and pipe 111 leading to the manual controller 9. As a result, the cut-off valve device 10 and interlock valve device 11 will occupy the same positions as shown in Fig. 1 at this time.

When the pilot piston 185 however obtains its right hand extreme position, the pipe 187 will be open to chamber 82, so that fluid supplied to said chamber for moving said piston will then flow through said pipe and past the check valve 194 to pipe 149 and thence to the cut-off valve device 10 for effecting operation thereof to cut-off the supply of fluid under pressure to chamber 21 at the left-hand side of the clutch control piston 18 and, at the same time, fluid supplied to pipe 149 will also cause operation of the interlock valve device 11 to connect the fuel supply control device 8 to the manual controller 9 for control therefrom, in the same manner as above described in connection with the structure shown in Fig. 1.

Subsequent return of operating lever 117 toward "Neutral" position or to the opposite end of the slot 122 and opening of pipe 110 to the atmosphere will result in the venting of fluid under pressure from chamber 82 at one side of the pilot piston 185 and thus from the cut-off valve device 10 and interlock valve device 11 by way of pipe 187, so long as pipe 187 is open to chamber 82 at the left-hand side of piston 185. Subsequent movement of the piston 185 from the right-hand end of the casing past the pipe 187 will however, connect pipe 149 to chamber 80 and thereby to the atmosphere through chamber 80 and pipe 111 with the control lever in the neutral position, this corresponding to that attained through chamber 79 provided between the two piston heads 77 and 78 of the pilot piston 74 shown in Fig. 1. Upon this release of fluid under pressure from pipe 149, the cut-off valve device and interlock valve device will operate in the same manner as before described in connection with the structure shown in Fig. 1.

In case, however, the operating lever 117 is moved from "Forward" position to the opposite end of slot 122, fluid will be supplied to pipe 111 and thereby chamber 80 at the right-hand side of the pilot piston 185 at substantially the same time as chamber 82 at the opposite side of said piston is opened to the atmosphere through pipe 110. In this case, the cut-off valve device 10 and interlock valve device 11 will operate in response to the reduction in pressure through pipe 187 while open to chamber 82, in the same manner as before described. However, as soon as the piston 185 moves away from the right-hand end of the casing a distance sufficient to open pipe 187 to chamber 80 which is being supplied with fluid pressure, such fluid pressure will tend to become effective through pipe 187 and the double check valve device 189 and pipe 149 on the cut-off valve device and interlock valve device. At the same time as this is occurring, however, the pressure in chamber 82 at the opposite side of the pilot piston is being vented. When this pressure in chamber 82 acting on the valve 193 in the double check valve device is reduced below the pressure building up in chamber 191 on the check valve 194, the check valve 194 will be seated and the check valve 193 unseated to thereby connect the cut-off valve device 10 and interlock valve device 11 to the reducing pressure in chamber 82 at the left-hand side of the pilot piston 185. The cut-off valve device 10 will therefore be maintained in the position for supplying fluid under pressure to actuate the clutch control piston 18, while the interlock valve device 11 will be maintained in the position to prevent acceleration of the engine until the pilot piston 185 substantially obtains its extreme left-hand position in which the pipe 188 is opened to chamber 80. When this connection is attained, fluid pressure effective in chamber 80 will then flow through pipe 188 and past the check valve 193 in the double check valve device 189 to pipe 149 for causing operation of the cut-off valve device 10 and interlock valve device 11 in the same manner as above described.

Other operations of this structure as in response to movement of the control lever 117 from "Neutral" position to the left-hand end of slot 122 or out of the slot 124 through the slot 122 and into slot 123, or vice versa, will be apparent from the above description and from the description in connection with the structure shown in Fig. 1 and therefore will be omitted.

*Description—Figure 7*

The cut-off valve device 10 and interlock valve device 11 may if desired be controlled by a structure like shown in Fig. 7 in which the pipe 149 is connected to the side outlet of double check valve 196 which structurally is like the double check valve 12 shown in Fig. 1. The opposite ends of this check valve are connected to pipes 110 and 111 whereby upon supply of fluid under pressure to either one of these pipes by operation of the manual controller 9 for effecting operation of the pilot piston, fluid at the same time will also flow from the pipe thus supplied with fluid under pressure through the double check valve device 196 to pipe 149, and provide the same increase in pressure in chamber 148 of the cut-off valve device and chamber 170 of the interlock valve device as is effective on the pilot piston. According to this structure, spring 153 in the cut- off valve device 10 and spring 168 in the interlock valve device 11 exert sufficient pressures on the diaphragm 147 and piston 164 respectively to hold said diaphragm and piston in the positions shown in Fig. 1 until after the pressure is increased in either pipe 110 or pipe 111 to the degree required to ensure movement of the pilot piston 74 into either one or the other of its extreme positions so as to thereby insure maintainance of the fluid pressure supply through pipe 62 to the clutch control piston 18 for moving same to either its forward or reverse position and for also maintaining the fuel supply arm 5 in idling position until after piston 18 obtains said position. A slight further increase in pressure in pipe 110 or pipe 11 will then operate the cut-off valve device and interlock valve device to relieve the load of piston 18 from the clutch arm 3 and to provide for acceleration of the engine in accordance with the desire of the operator.

Upon movement of lever 117 from either end of the slot 122 back to "Neutral" position, the cut-off valve device 10 and interlock valve device 11 will return to their normal positions shown upon the initial reduction in pressure in pipe 110 or 111 and thus in pipe 149 through the check valve 196, to thereby insure that the arm 5 of the fuel supply device will be returned to idling position prior to disengagement of the clutch. In case the lever 117 is moved from its "Forward" position to its "Reverse" position or vice versa, the consequent reduction in pressure in either one of pipes 110 or 111 will cause movement of the cut-off valve device 10 and interlock valve device 11 to the positions shown in Fig. 1 in which they will remain until the pressure in the other pipe 110 or 111 is subsequently increased to the degree required for moving the clutch to its other position at which time the cut-off valve device will again operate to remove the load on piston 18 and the interlock valve device will operate to provide for acceleration of the engine as will be readily apparent from the above description.

*Description—Figure 8*

In the structures shown in Figs. 1 and 6 operation of the cut-off valve device 10 and interlock valve device 11 upon movement of lever 117 to either one end or the other of slot 122, is controlled by the position of the pilot piston 74 and is thus operative indirectly in accordance with the position of the clutch control piston 18 clutch arm 3 and clutch part controlled thereby. In the structure shown in Fig. 7 the operation of these devices is also indirect in accordance with the position of the clutch control piston 18 in that their operation upon movement of lever 117 to either end of slot 122 is delayed until a sufficient pressure is obtained on the pilot piston to move it to either one or the other of its extreme positions. If desired however the operation of the cut-off and interlock valve devices may be controlled directly in accordance with the position of the clutch control piston 18 by a structure such as shown in Fig. 8.

According to this modification the pressure head 17 shown in Fig. 1 applied to one end of the cylinder 15 is replaced by a pressure head 200 and the pressure head 73 (Fig. 1) of the pilot cylinder device 70 is replaced by a head 201, one side of which is mounted against the pressure head 200 over and closing one end of a bore 203 which contains a valve in the form of a piston 204. At the side of this piston adjacent the pilot device 70 is a chamber 205 connected to a passage 206 which is open to chamber 79 between the pressure heads 77 and 78 of the pilot piston 74, like pipe 149 in the structure shown in Fig. 1. At the opposite side of piston 204 is a non-pressure chamber 216 which is constantly open to the atmosphere through a passage 207.

The pipe 149 connected to the cut-off valve device 10 and interlock valve device 11 is in this embodiment connected through the pressure head 200 to bore 203 intermediate the ends thereof. This connection between pipe 149 and bore 203 is such that with the piston in its upper position as shown, said pipe will be open to the atmosphere through passage 207, while in a lower position of piston 204, which will be later described, the pipe 149 will be open to passage 206 leading to the pilot piston 74.

The piston 204 has a stem 208 extending through the non-pressure chamber 216 for engagement with a control plunger 209 arranged above and parallel to the piston rod 19, this plunger being mounted to slide in a bore in pressure head 200 and being provided outside the pressure head with a slot 210 through which extends a pin 211 secured in lever 92 intermediate the connections between said lever and the piston rod 19 and pilot piston rod 75. In the side of plunger 209 adjacent the end of stem 208 are two spaced notches providing an elevated surface 212 formed between two lower surfaces 213 and 214 and which constitute a track for defining two different positions of stem 208 and piston 204. With stem 208 in contact with surface 212 the piston will be elevated to the position shown for opening pipe 149 to the lower side of the piston and thus to the atmospheric passage 207. With stem 208 in contact with either surface 213 or 214, the piston 204 will be lowered to a position in which pipe 149 is opened to chamber 205 above the piston and thereby to passage 206 leading to the pilot piston 74. The surface 212 is connected to the surfaces 213 and 214 by diagonal surfaces as shown in order that the plunger 209 upon movement in its bore may urge the piston from its lower position to its upper position, in which it is shown in the drawing.

When the pilot piston 74 and clutch control piston 18 are in their neutral positions shown, the pin 211 in lever 92 will be in engagement with either one end of the slot 210 or the opposite end depending upon the position which the clutch piston 18 occupied just prior to movement to its neutral position. With the plunger 209 in either of these positions, the piston stem 208 will be in contact with the surface 212 at either one end or the opposite end thereof in order to maintain the piston 204 in its upper position, so that pipe 149 will be open to the atmosphere.

Now let it be assumed that the manual controller 9 (Fig. 1) is operated to supply fluid under pressure to pipe 110 for effecting movement of the clutch arm 3 from its "Neutral" position to its "Forward" position. This supply of fluid under pressure to pipe 110 will actuate the pilot piston 74 to cause movement of the clutch control piston 18 from its neutral position in the direction of the right-hand end of the cylinder 15 in the same manner as before described. The plunger 209 will move with the piston 18 as will be apparent. At the time the pilot piston 74 moves substantially into its right-hand position, the passage 206 will be opened to pressure chamber 82, so that fluid may then flow into said passage.

This supply of fluid to passage 206 will not however cause operation of the interlock valve device 11 and cut-off valve device 10 at this instant like the supply of fluid past the pilot piston 74 in the structure shown in Fig. 1, since the flow of fluid from passage 206 to pipe 149 in this structure will at this time be blocked by piston 204, which will be still held above the connection with pipe 149 by plunger 209. However, as the clutch control piston 18 approaches the right-hand end of cylinder 15, the surface 212 on plunger 209 will be moved out of contact with the end of piston stem 208 and the surface 214 on the plunger will be moved beneath the stem at substantially the time the clutch control piston attains the position in which the clutch arm 3 will be in "Forward" position. With the surface 214 thus positioned beneath stem 208, the pressure of fluid supplied through passage 206 to chamber 205 above the piston 204 will move said piston downwardly past the connection between pipe 149 and bore 203 and fluid supplied past the pilot piston 74 to chamber 205 will then flow through pipe 149 to the cut-off valve device 10 and interlock valve device 11 for effecting operation thereof in the same manner as before described. This operation of the cut-off valve device and interlock valve device, it will be noted, is dependent upon the clutch control piston 18 attaining a chosen position and is thereby directly controlled in accordance with such position.

Now if the operator desires to move the clutch arm 3 from "Forward" position back to "Neutral," he operates the manual controller 9 to release fluid under pressure from pipe 110 to permit the pilot piston to return toward neutral position to actuate the controller lever 39 to open chamber 21 to the atmosphere and open chamber 30 to pipe 62. Fluid under pressure will be released from pipe 149 past the piston valve 204 by way of pipe 110 before the pilot piston starts moving out of its right hand position and by way of chamber 79 subsequent to such movement to cause the cut-off valve device and interlock valve device to operate in the same manner as before described to provide for reducing the speed of the engine to idling and to supply fluid under pressure to pipe 62 and thence through the controller 35 to chamber 30 at one side of piston 18. The clutch control piston 18 will then be moved back in the direction of neutral position and the pilot piston 74 will move therewith until its neutral position is attained, following which the further movement of the clutch control piston 18 to its neutral position will operate the controller 35 to cut-off the supply of fluid under pressure to chamber 30 and then vent said chamber at the time said piston attains its neutral position so as to prevent further movement thereof.

As the clutch control piston is thus returned to its neutral position, it moves relative to plunger 209 until the pin 211 in lever 92 engages the left hand end of slot 210 after which the rod 209 is moved along with the piston 18. When the piston 18 obtains its neutral position the plunger 209 will be so positioned that the stem 208 depending from the piston 204 will be in contact with the left-hand end of the surface 212 whereby the piston 204 will be elevated to the position shown for closing communication between passage 206 and pipe 149 and for opening said pipe to the atmosphere through passage 207.

The operation of this structure in response to movement of the control lever 117 to the left hand end of slot 122 for effecting movement of the clutch control arm to "Reverse" position is substantially the same as just described for moving the clutch arm 3 to its "Forward" position and therefore will not be described.

In this embodiment it is important to note that since the piston 204 is controlled directly in accordance with the position of the clutch control piston 18 the operation of the cut-off valve device and interlock valve device are also directly controlled in accordance with the position of piston 18 to thereby ensure definite positioning of piston 18 before operation of the cut-off valve device to relieve the actuating pressure on piston 18 and also before the interlock valve device operates to provide for acceleration of the engine.

Communication between pipes 110 or 111 and passage 206 leading to plunger 209 is interlocked through the pilot piston 74 in this embodiment only for the purpose of disconnecting passage 206 from the one of said pipes which is open to the atmosphere through the manual controller 9 when said manual controller is operated to control the clutch through the other of said pipes.

*Description—Figure 9*

According to this embodiment of the invention a manual controller 217 is used in place of the controller 9 shown in Fig. 1 for controlling the positioning of clutch arm 3 and the speed of the engine.

The manual controller 217 comprises a body portion 218 containing two valve devices 219 and 220 arranged to supply and release fluid under pressure to and from pipes 221 and 222, respectively. Each of these valve units may be identical to the structure shown in Fig. 4 and are disposed at opposite sides of the operating lever 117 with the valve unit 219 located at the side of the lever adjacent the front end of the craft. A cover 223 is secured to the body position 218 and this cover has a slot 224 extending parallel to the length of the craft and through which the operating lever 117 extends, said slot providing for movement of said lever from a neutral position in which it is shown only in directions toward the front or stern of the craft.

Upon movement of lever 117 from neutral position forward of the craft to a position indicated by a line bearing a legend "Forward" the valve device 219 is operative to supply fluid at a certain limited degree of pressure such as ten pounds, to the pipe 221, while upon further movement in a zone bearing the legend "Speed control" the valve device 219 is operative to increase the pressure in pipe 221 to a degree above ten pounds corresponding to the extent of forward movement of the lever in said zone. Movement of the lever 117 toward the stern of the craft is arranged to operate the valve device 220 to provide a certain pressure such as ten pounds in pipe 222 at the time the lever attains the position bearing the legend "Reverse," while upon further movement of the lever into the zone indicated as "Speed control" the valve device is operative to increase the pressure in pipe 222 in accordance with the extent of movement in said zone.

The pipes 221 and 222 lead to pressure chambers 225 and 226 provided at one side of two pistons 227 and 228 in two like clutch control valves 229 and 230, respectively.

In addition to piston 227 the clutch control valve 229 comprises two oppositely seating valves 231 and 232 disposed in coaxial relation with said piston at one side thereof. The valve 232 is contained in a chamber 233 which is constantly supplied with fluid under pressure by way of a pipe 234 connected with any suitable fluid pressure source. The valve 231 is contained in a chamber 235 which is in constant communication with the atmosphere through a port 236. These valves have oppositely disposed fluted stems slidably mounted in bores and engaging each other in a chamber 237 which is in constant communication with pipe 110 leading to the pilot device 70. The piston 227 has a stem 238 extending through a bore opening to chamber 235 and in this stem is a plunger 239 extending through the end of the stem for engagement with valve 231 and a spring 240 acting on said plunger urging same in a direction out of the end of the stem. The fit between the stem 238 and the bore in the casing is such that the chamber below piston 227 will be open to chamber 235 and thereby to the atmosphere through passage 236 at all times.

A spring 241 in chamber 233 acts on the valve 232 with such force as to insure seating of valve 232 and unseating of valve 231 when the pressure in chamber 225 above the piston 227 is below a certain degree and to provide for seating of the valve 231 and unseating of the valve 232 by movement of piston 227 when piston 227 is subject to fluid in chamber 225 at the pressure provided in the "Forward" position of the operating lever 117.

The clutch control valve 230 comprises two oppositely seating valves 242 and 243 contained in chambers 244 and 245 open respectively to the atmospheric passage 236 and fluid pressure supply pipe 234. These valves also have fluted stems extending into engagement with each other in a chamber 246 to which pipe 111 is constantly connected. The piston 228 has a stem 247 containing a plunger 248 engaging the valve 242 and a spring 249 acting on the plunger 248. The stem 247 also has a sufficiently loose fit in the bore in which it operates to provide for the chamber at the lower side of the piston being open to the atmosphere by way of chamber 244. A spring 250 in chamber 245 acts on the valve 243 with such force as to hold same seated and the valve 242 unseated when the pressure of fluid in chamber 226 on the top of the piston 228 is less than a certain degree and to provide for seating of valve 242 and unseating of valve 243 when the pressure in said chamber is increased to the degree provided in "Reverse" position of the operating lever 117.

From the above description it will be seen that when the operating lever is moved to "Forward" position, the fluid pressure supplied to chamber 225 will move the piston 227 downwardly for closing valve 231 and opening valve 232. With the valve 232 open, fluid under pressure will flow from chamber 233 to chamber 237 and thence through pipe 110 for effecting operation of the pilot device 70 and clutch control piston 18 to move the clutch lever 3 from "Neutral" position to its "Forward" position. On the other hand, if the lever 117 is moved to "Reverse" position, the fluid pressure supplied to chamber 226 will actuate piston 228 to close the valve 242 and unseat the valve 243 for thereby supplying fluid under pressure to pipe 111 for effecting operation of the pilot device 70 and clutch piston 18 to move the clutch lever from "Neutral" position to its "Reverse" position.

The pipes 221 and 222 are connected to the opposite ends of a double check valve device 251, the side outlet of which is connected to pipe 106 leading to the fuel supply control device 8. The fuel supply control device 8 may be identical to that disclosed in Fig. 1 except provided with a spring 252 which acts on the piston 100 with such force as to maintain the piston in its engine idling position shown against pressure of fluid attained in pipes 221 or 222 when the operating lever 117 is in either its "Forward" or its "Reverse" position. It will be noted that when the lever 117 is moved to its "Forward" position, fluid supplied to pipe 221 will flow through the double check valve 251 and pipe 106 to chamber 105 in the fuel supply control device 8, while, when the lever is moved to "Reverse" position this chamber will be supplied with fluid under pressure from pipe 222 through the double check valve device 251. Thus when the operating lever 117 is moved to either its "Forward" or "Reverse" position for engaging the clutch as above described, the same pressure as provided in pipe 221 or 222 for causing operation of the clutch arm 3 will be effective in chamber 105 of the fuel supply control device 8, which pressure however will not move the piston 100 in said device out of its engine idling position shown in the drawing.

To move the piston 100 in the fuel supply control device 8 out of idling position the lever 117 must be moved either beyond the "Forward" position or "Reverse" position into the zone providing for speed control to thereby provide a greater degree of pressure in either pipe 221 or pipe 222 and thereby in chamber 105 on piston 100 of the fuel supply control device 7. This greater pressure obtained in chamber 105 will then move piston 105 out of idling position for accelerating the engine to a degree dependent upon the distance the piston is moved from its idling position shown, and which in turn depends upon the extent of movement of the operating lever away from either the "Forward" or "Reverse" position into one or the other of the speed control zones.

When the operator desires to move the clutch control lever 3 to "Neutral" position when the craft is moving either forwardly or in reverse, he returns the lever to neutral position shown and during such movement it will be seen that the pressure in chamber 105 of the fuel supply control device 8 will reduce to the degree providing for movement of piston 100 back to its engine idling position, before the pressure in chamber 225 or 226 of the clutch control valves 229 or 230, respectively, becomes reduced sufficiently for piston 227 or 228 to return to its upper position for cutting off the supply of fluid under pressure to pipe 110 or 111 and venting said pipe so as to cause disengagement of the clutch.

Thus, with this structure the parts controlling the clutch will operate to effect engagement of the clutch before the fuel supply control device operates to accelerate the engine and said device will operate to provide for reducing the speed of the engine to idling before said parts operate to effect disengagement of the clutch. Of importance is the fact that these controls are attained merely by movement of the lever 117 in a straight line from its neutral position, the lever being movable in the direction of the front of the craft when movement of the craft in that direction is desired and toward the stern of the craft when movement in reverse is desired and acceleration of the engine being controlled by further movements of said lever in the same direction.

Like the manual controller 9 a spring pressed shoe 178 on the operating lever 117 may engage a surface on the interior of the cover portion 211. This surface between the forward and reverse positions is arcuate in shape to provide for automatic return of the lever to neutral position from either "Forward" or "Reverse" positions upon release of the lever by the operator. Beyond the "Forward" or "Reverse" positions the inner surface of the cover is engaged by the shoe 170 which surface is disposed at right angles to the lever 117 when the lever is in its neutral position so that friction between the shoe 178 and these portions of the surface will hold the lever 117 in any desired position in either of the speed control zones without manual effort.

*Description—Figure 10*

According to this embodiment a manual controller 255 is provided for controlling operation only of the clutch control pilot device 70 and thereby the clutch actuating piston 18, and a separate controller 256 is provided for controlling operation of the fuel supply control device 8 and thereby the speed of the engine. The controller 255 may be the same as the controller 9 except that the valve units 116 and 115 and the slots 123 and 124 are omitted. In other words, this control valve has only a slot 122 providing for movement of lever 117 either toward the front or toward the stern of the craft to provide for control of the clutch.

The controller 256 may be of any suitable type comprising an operating handle 257 having an idling position such as shown in the drawing for effecting a release of fluid under pressure from piston chamber 105 in the fuel supply control device 8 in order to provide for operation of the engine at idling speed. The handle may be movable from this position through a zone to a position indicated by a line 258 for supplying fluid to chamber 105 in the fuel supply control device 8 at a pressure dependent upon the extent of movement from idling position, the maximum degree of pressure and therefore operation of the engine at full speed or full output being attained with the handle 257 in the position indicated by line 258.

It is desired that the handle 257 be in its idling position whenever the clutch on the craft controlled by the manual controller 255 is disengaged and until after the clutch is engaged. To accomplish this end a cylinder 259 is associated with the speed control device 256. This cylinder contains a piston 260 having a stem 261 so arranged as to engage an extension 262 of lever 257. The piston 260 has at one side a pressure chamber 263 connected to a pipe 264 leading to the side outlet of a double check valve device 265. At the opposite side of the piston is a spring 266 acting on the piston for urging same in the direction of the extension 262 of lever 257. With the lever 257 in any position out of its idling position, the spring is operative through the piston 260 and plunger 261 to move the lever back to idling position when the chamber 263 is at or substantially at atmospheric pressure.

The opposite ends of the double check valve 265 are connected to pipes 110 and 111 whereby upon supply of fluid under pressure to either of said pipes for effecting movement of the clutch arm 3 to either the "Forward" or "Reverse" position fluid will flow through the double check valve device and pipe 264 to chamber 263 and therein act on piston 260 against the spring 266. When the pressure in either pipe 110 or 111 is increased to a degree which insures movement of the pilot piston 74 to either of its extreme positions, this pressure then overcomes the opposing pressure of spring 266 and moves the piston 260 to a position in which plunger 161 is withdrawn from the zone of movement of extension 262 when the lever 257 is operated between its idling position shown and the full speed position indicated by line 258.

It will thus be seen that when either of the pipes 110 or 111 is supplied with fluid at a pressure required for effecting movement of the clutch arm 3 to either its "Forward" or "Reverse" position, the cylinder device 259 will be conditioned to provide for desired positioning of the speed control lever 259 between idling position and the full speed or power position indicated by line 258.

However, when the manual controller 255 is operated to release fluid under pressure from either pipe 110 or 111 for effecting movement of the clutch control arm 3 out of either the "forward" or "reverse" position, the spring 266 will act upon initiating such reduction in pressure in either of said pipes and thereby in piston chamber 263 to project the plunger 261 for moving the speed control lever 257 to its idling position in which it will be maintained until fluid pressure is subsequently increased in pipe 110 or pipe 111 to a degree required for positioning the clutch lever 3 in either "Forward" or "Reverse" position.

This structure therefore provides for reducing of the speed of the engine to idling and for maintaining the speed at idling upon disengagement of the clutch and while the clutch is disengaged and further insures against the engine being accelerated until subsequent engagement of the clutch.

Description—Figure 11

If desired, the device for positioning the clutch operating arm 3 may be of a type capable of control electro-pneumatically from a manual controller such as the device 9. Such an arrangement is shown in Fig. 11, which arrangement comprises two magnets 270 and 271 arranged for controlling the supply of fluid under pressure to and the release of fluid under pressure from pipes 110 and 111 respectively for controlling the position of the clutch arm 3. Both of these magnets may be identical and may comprise two oppositely seating valves 272 and 273 contained in chambers 274 and 275, respectively. A spring 277 in chamber 274 acts on valve 272 for seating same and unseating the valve 273 upon deenergization of the controlling magnet. The chamber 274 is constantly supplied with fluid under pressure from a supply pipe 276 while chamber 275 is in constant communication with the atmosphere.

Energization of magnet 270 is adapted to seat valve 273 and unseat the valve 272 to thereby supply fluid under pressure from pipe 276 to pipe 110 for effecting movement of the clutch control arm 3 to its "Forward" position, while energization of magnet 271 is arranged to cause fluid under pressure to be supplied from pipe 276 to pipe 111 for effecting movement of the clutch control arm 3 to its "Reverse" position, in the same manner as when fluid pressure is supplied to either of these pipes by operation of the manual controller 9 shown in Fig. 1.

In this embodiment, the controller 9 is arranged in its forward position to supply fluid under pressure to a pipe 279 and in its reverse position to supply fluid under pressure to a pipe 280, these pipes corresponding to the pipes 110 and 111 connected to the controller in Fig. 1. The pipe 279 leads to a chamber 281 provided at one side of a piston 282, the opposite side of which is subject to the opposing pressure of a spring 283. The piston is provided with a stem for operating a switch 284 arranged to electrically connect a battery 285 to a wire 286 connected with the electromagnet 270.

When the controller 9 is moved toward the right-hand to cause movement of the craft forwardly, the fluid pressure supplied to pipe 279 will flow to chamber 281 and therein act on piston 282 to effect movement of said piston in the direction of the left-hand. This movement will actuate the switch 284 to connect the battery 285 to wire 286 for thereby effecting energization of the electromagnet 270 to supply fluid under pressure to pipe 110. This supply of fluid to pipe 110 will then actuate the clutch control device 6 to effect movement of clutch control arm 3 to its "Forward" position in the same manner as above described.

Return of the lever 117 in the manual controller 9 to neutral position will vent fluid under pressure from pipe 279 whereupon spring 283 will return the piston 282 to the position shown for thereby opening the connection between battery 285 and wire 286 for effecting deenergization of the electromagnet 270. This deenergization of of electromagnet 270 will in turn release fluid under pressure from pipe 110 whereupon the clutch control device will operate to return the clutch control lever 3 from its "Forward" position to its "Neutral" position.

Movement of the lever 117 toward the left-hand or stern of the craft will supply fluid under pressure through pipe 280 to a chamber 287 at one side of a piston 288 for actuating said piston to thereby move a switch member 289 into circuit closing relation between battery 285 and a wire 290. The electromagnet 271 will as a result be energized to supply fluid under pressure to pipe 111 whereupon the clutch control device 6 will operate to effect movement of the clutch control arm 3 from its "Neutral" position to its "Reverse" position. Upon return of lever 117 to its neutral position a spring 291 acting on piston 288 will actuate same and thereby the switch 289 to break the circuit between battery 285 and electromagnet 271 whereupon fluid under pressure will be released from pipe 111 and as a result the clutch control device will operate to return the clutch control lever 3 from its "Reverse" position to its "Neutral" position.

Description—Figure 12

According to this embodiment of the invention the clutch control lever 3 is pivotally connected by a rod 295 to a lever 296 intermediate its ends. One end of the lever 296 is pivotally connected to the end of a piston rod 297 which projects from a piston 298 mounted to reciprocate in a cylinder 299. The opposite end of the lever 296 is pivotally connected to the end of a piston rod 300 which projects from a piston 301 mounted to reciprocate in a cylinder 302. The two cylinders 299 and 302 are oppositely disposed and arranged one at either side of the lever 296. The piston 298 in cylinder 299 has at one side a pressure chamber 303 and at the opposite side a pressure chamber 304, while at opposite sides of the piston 301 are corresponding pressure chambers 305 and 306.

When the pistons 298 and 301 are at the opposite ends of their cylinders and in contact therewith, the clutch control lever 3 will occupy its "Neutral" position shown. Movement of the piston 298 in the direction of the right-hand with the piston 301 remaining stationary will rock the lever 296 about the fulcrum connection with piston rod 300 to operate the rod 295 for rocking the clutch control lever 3 from its "Neutral" position to its "Forward" position. Return of piston 298 to the position shown in contact with the left-hand end of the cylinder 299 will return the lever 296 to its normal position shown and thereby return the clutch control lever 3 from "Forward" position to its "Neutral" position shown. On the other hand, with the piston 298 remaining in contact with the left-hand end of cylinder 299 movement of the piston 301 in the direction of the left-hand will rock the lever 296 and thereby the clutch arm 3 from "Neutral" position to its "Reverse" position while return of the piston 301 into engagement with the right-hand end of cylinder 302 will cause the return of the clutch arm from "Release" position to its "Neutral" position.

This operation of the pistons in the two cylinders 299 and 302 may be controlled from a manual controller 9 like employed in the equipment shown in Fig. 1 which is operative upon movement toward the front of the craft to supply fluid under pressure to a pipe 110 while retaining pipe 111 open to the atmosphere and upon movement in the opposite direction toward the stern of the craft to supply fluid under pressure to pipe 111 while retaining pipe 110 open to the atmosphere.

In the present structure the piston 298 in cylinder 299 is arranged to be controlled from pipe 110 through the medium of an operating valve device 307 and a cut-off valve device 308, while the piston 301 in the cylinder 302 is arranged to be controlled from pipe 111 through the medium of an operating valve device 309 and a cut-off valve device 310, the valve devices 309 and 310 being functionally and structurally like the valves 307 and 308, respectively.

The operating valve devices 307 and 309 each comprises a double beat valve 311 contained in a chamber 312 which in the device 307 is connected to chamber 303 in the cylinder 299 while in the device 309 this chamber 312 is connected to chamber 305 in the cylinder 302. This valve 311 in each of the devices 307 and 309 is arranged to control communication between chamber 312 and a pipe 313 which is constantly supplied with fluid under pressure from pipe 135 through which fluid is supplied to the manual controller 9, and between the chamber 312 and a chamber 314 which is constantly open to the atmosphere through a passage 315. Below chamber 314 is a piston 316 having at its lower face a pressure chamber 317 and at its opposite face a chamber 318 open to chamber 314 and thereby the atmosphere and containing a spring 319 acting on the piston 316 for urging same and thereby the valve 311 to the position shown for closing communication between chambers 312 and 314 when the pressure chamber 317 is at atmospheric pressure. The chamber 317 in the operating valve device 307 is open to pipe 110 and in the operating device 309 is open to pipe 111.

The cut-off valve devices 308 and 310 each comprises a double beat valve 320 contained in a chamber 321 and arranged to control communication between said chamber and a chamber 322 at one side which is constantly open to the atmosphere. The double beat valve 320 in the cut-off valve device 308 is also arranged to control communication between chamber 321 and pipe 110 while in the valve device 310 it controls communication between chamber 321 and pipe 111. Below chamber 322 in each of the cut-off valve devices 308 and 310 is a piston 323 connected to the valve 320 and having at its lower face a pressure chamber 324 and at its opposite face a chamber open to chamber 322 and containing a spring 325 acting on the piston for urging same and the double beat valve 320 to the position shown when the pressure chamber 324 is at atmospheric pressure. The pressure chamber 324 in the cut-off valve device 308 is connected to pipe 110 and in the cut-off valve device 310 is connected to pipe 111.

When pipe 110 is open to the atmosphere, as with the operating lever 117 in its neutral position or upon movement of said lever toward the stern of the craft for supplying fluid to pipe 111, the piston chambers 317 and 324 in the operating valve device 307 and cut-off valve device 308 are both vented, so that the double beat valves 311 and 320 in said devices will both be seated in their lower positions shown.

With the double beat valve 311 in the operating valve device 307 seated in its lower position fluid under pressure from the supply pipe 135 will flow past the double beat valve to chamber 312 and thence into chamber 303 of the cylinder 299 at one side of the piston 298. With the double beat valve 320 in the cut-off valve device 308 also in its lower position chamber 304 at the left-hand face of piston 298 in the cylinder 299 will be open to pipe 110 and thus to the atmosphere. The pressure of fluid in chamber 303 acting on the opposite face of piston 298 will therefore be effective to hold said piston against the left-hand end of the cylinder 299.

Likewise with pipe 111 open to the atmosphere with the operating lever 117 in its neutral position or in the position for supplying fluid under pressure to pipe 110 the operating valve device 309 will be conditioned to connect chamber 305 in the cylinder device 302 to the fluid pressure supply pipe 135 so that said chamber will be charged with fluid under pressure, while chamber 306 at the opposite side of piston 301 will be open to the atmosphere by way of the cut-off valve device 310 and pipe 111. The piston 301 will therefore be held against the right hand end of cylinder 302 by the pressure of fluid in chamber 305.

With the pistons 298 and 301 positioned at opposite ends of their cylinders as just described, the lever 296 will position the clutch control arm 3 in its "Neutral" position in which the clutch is disengaged and as shown in the drawing.

If the operator desires that the craft move in a forwardly direction, he will rock lever 117 in the manual controller 9 toward the right-hand, which may be in the direction of movement of the craft to thereby supply fluid under pressure through pipe 110 to piston chamber 317 in the operating valve device 307 and to piston chamber 324 in the cut-off valve device 308 and also past the double beat valve 320 in the cut-off valve device to chamber 321 therein. When the pressure of fluid in chamber 317 on one side of the piston 316 in the operating valve device 307 is increased to a certain degree, such as five pounds per square inch, this pressure will overcome the opposing force of spring 319 on said piston and actuate same to move the double beat valve 311 to its upper seated position for cutting off the supply of fluid under pressure from pipe 313 to chamber 303 in the cylinder 299 and for opening said chamber past the double beat valve to chamber 314 which is open to the atmosphere to passage 315. As a result, the fluid under pressure provided in chamber 303 of the cylinder 299 with the operating lever 117 in neutral position will be vented to the atmosphere. At the same time, however, fluid under pressure supplied through pipe 110 and past double beat valve 320 to chamber 321 in the cut-off valve device 308 will flow to chamber 304 at the left-hand side of piston 298 in the cylinder 299 and move said piston toward the right hand. This movement of piston 298 will rock the lever 296 about its fulcrum connection with piston rod 300 and actuate the rod 295 to rock the clutch lever 3 in a clockwise direction from "Neutral" position to its "Forward" position.

During movement of the piston 298 under the influence of fluid pressure supplied from pipe 110 to chamber 304 the pressure of fluid in said pipe will be increasing and when increased to a certain relatively high degree such as fifty pounds which is adequate to insure desired positioning of the clutch control lever 3, this pressure in chamber 324 acting on piston 323 of the cut-off valve device 308 will overcome the opposing force of spring 326 on said piston and move said piston and thereby the double beat valve 320 to its upper seated position for closing communication between pipe 110 and chamber 304 in the cylinder 299 and for opening said chamber past the double beat valve 320 to chamber 322 which is open to the atmosphere. When this occurs, the fluid pressure in chamber 304 of the cylinder device 299 will be released to the atmosphere. The opposite sides of piston 298 in the cylinder 299 will now be both subjected to atmospheric pressure so as to remove the actuating force of piston 298 on the lever 3 and thereby parts of the clutch, it being noted that such relief of force will not occur until after the clutch has attained its forward engaged position.

It will be noted that when the clutch arm 3 is moved to "Forward" position by operation of the cylinder device 299 the lever 296 is effective to provide for such movement, only due to the fact that its lower end is held fixed by pressure of fluid in chamber 305 of the cylinder 302 holding the piston 301 against the right-hand end of the cylinder.

If the operator now desires to move the clutch arm 3 from its "Forward" position back to "Neutral", he will return the operating lever 117 to its neutral position for thereby releasing fluid under pressure from pipe 110. Upon a slight reduction in this pressure spring 326 in the cut-off valve device 308 will return the piston 324 to its lower position for operating the valve 320 to connect chamber 304 in the cylinder 299 to pipe 110 whereby upon complete venting of the pipe 110 said chamber will also be at atmospheric pressure. When the pressure of fluid in pipe 110 is reduced to a degree below the opposing force of spring 319 on piston 316 in the device 307 said piston and thereby the double beat valve 311 will be returned to their lower position as shown whereupon fluid under pressure from supply pipe 135 will be supplied past the double beat valve 311 to chamber 303 at the right-hand side of piston 298 in the cylinder 299. This pressure acting on the piston 298 with its opposite face open to the atmosphere will then move said piston back to its normal position into engagement with the left-hand end of the cylinder 299 and this movement will rock the lever 296 and thereby the clutch operating arm 3 back to the "Neutral" position of said arm.

If the operator now desires to move the craft in reverse, he will move the lever 117 in the direction of the stern of the craft and thereby supply fluid under pressure to pipe 111 and thence to the valve devices 309 and 310. The valve device 309 will operate upon an increase in pressure in pipe 111 to for instance five pounds to vent fluid under pressure from chamber 305 at the left-hand side of piston 301 in cylinder 302, while the supply of fluid under pressure through the cut-off valve device 310 to chamber 306 at the opposite side of piston 301 will operate said piston to rock the lever 296 about its fulcrum connection with piston rod 297 to thereby pull the clutch operating arm 3 from "Neutral" position to its "Reverse" position. After the lever 3 attains its "Reverse" position, the cut-off valve device 310 will operate to open chamber 306 to the atmosphere for relieving the force of fluid pressure on piston 301 from the clutch operating arm 3 in its "Reverse" position.

Return of the clutch control lever 3 from "Reverse" position to its "Neutral" position will be accomplished by return of the lever 117 to neutral position in a manner which will be apparent from the above description.

*Summary*

From the above description it will be seen that I have provided an improved power arrangement for controlling the positioning of a multi-position clutch or the like and the speed or output of an engine connected with the clutch whereby the engine fuel supply device is conditioned to provide for operation of the engine at idling speed when the clutch is disengaged and which allows for acceleration of the engine above idling speed only upon or subsequent to engagement of the clutch and which also relieves the clutch and its operating parts of the force required to move same to a desired position after such position has been attained.

The arrangement is particularly adapted though not necessarily limited for use on water craft which is movable either forwardly or in reverse, and the manual controller for controlling the clutch operation and engine speed or output of power is so arranged as to require natural movements of the operator to facilitate such control since the control lever can only be moved in the general direction of the desired movement of the craft to attain such movement and may then be moved either still further in the same direction or at an angle thereto for controlling the speed of the craft.

For the functions involved and the results possible of attainment the improved arrangement is relatively simple in construction, but of greater importance is the fact that it is positive in operation in response to movement of the manual control lever 117 in its controlling slot from one position to another.

While the above description of the invention has been limited to the control of water craft, it is desired to point out that the invention is equally applicable to the control of clutches, speed or power output of internal combustion engines, etc., used in connection with any other type of conveyance, such as rail locomotives, as will be readily apparent to those skilled in the art. It is not the intention therefore to limit the scope of the invention except by the terms of the appended claims.

Having now described my invention, what I claim as new and desire to secure by Letters Patent, is:

1. The combination with a member to be operated, of a pressure responsive element connected to said member and operable by fluid under pressure supplied to act on one side to actuate said member, a fluid pressure supply pipe, fluid pressure controlled pilot means having a connection with said element providing for a certain initial movement of said pilot means relative to said element and then movement with said element, said pilot means being operable by fluid under pressure upon said initial movement to open communication between said pipe and one side of said element for supplying fluid under pressure to said one side of said element for moving same, said pilot means being operable to maintain said communication open during movement with said element, stop means arranged to arrest movement of said pilot means after a certain degree of movement with said element, valve means controlling the supply of fluid under pressure to said pipe and operative to cut-off said supply and to release the fluid under pressure from said pipe, and means operative upon said arresting of said pilot means to provide for operation of said valve means.

2. The combination with a member to be operated, of a pressure responsive element connected to said member and operable by fluid under pressure supplied to act on one side to actuate said member, a fluid pressure supply pipe, fluid pressure controlled pilot means having a connection with said element providing for a certain initial movement of said pilot means relative to said element and then movement with said element, said pilot means being operable by fluid under pressure upon said initial movement to open communication between said pipe and one side of said element for supplying fluid under pressure to said one side of said element for moving same, said pilot means being operable to maintain said communication open during movement with said element, stop means arranged to arrest movement of said pilot means after a certain degree of move-means with said element, valve means controlling the supply of fluid under pressure to said pipe and operative to cutoff said supply and open said pipe to atmosphere, means operative upon supply of fluid under pressure to a chamber to actuate said valve means, manually controlled means operative to supply fluid under pressure to said pilot means to actuate same, said element being operative upon actuating said member, to supply fluid under pressure from said manually controlled means to said chamber for actuating said valve means and being operative at all other times to open said chamber to atmosphere.

3. The combination with a member to be operated, of a pressure responsive element connected to said member and operable by fluid under pressure supplied to act on one side to actuate said member, a fluid pressure supply pipe, fluid pressure controlled pilot means having a connection with said element providing for a certain initial movement of said pilot means relative to said element and then movement with said element, stop means arranged to arrest movement of said pilot means after a certain degree of movement with said element, said pilot means being operable by fluid under pressure upon said initial movement to open communication between said pipe and one side of said element for supplying fluid under pressure to said one side of said element for moving same, said pilot means being operable to maintain said communication open during movement with said element and upon being arrested by said stop means, valve means controlling the supply of fluid under pressure to said pipe and operative to cut-off said supply and to release fluid under pressure from said pipe, means operative upon a certain increase in pressure in a chamber to actuate said valve means to release fluid under pressure from said pipe, said pilot means in its arrested position supplying fluid under pressure to said chamber and being operative when out of said position to release fluid under pressure from said chamber.

4. The combination with a member to be operated, of a pressure responsive element connected to said member and operable by fluid under pressure supplied to act on one side to actuate said member, a fluid pressure supply pipe, fluid pressure controlled pilot means having a connection with said element providing for a certain initial movement of said pilot means relative to said element and then movement with said element, said pilot means being operable by fluid under pressure upon said initial movement to open communication between said pipe and one side of said element for supplying fluid under pressure to said one side of said element for moving same, stop means arranged to arrest movement of said pilot means after a certain degree of movement with said element, said pilot means being operable to maintain said communication open during movement with said element and upon being arrested by said stop means, valve means controlling the supply of fluid under pressure to said pipe and operative to cut off said supply and open said pipe to atmosphere, means acting on said pilot means requiring a certain increase in fluid pressure thereon for moving said pilot means to its arrested position, and means operative upon an increase in pressure on said pilot means to a degree exceeding said certain increase to actuate said valve means to cut-off the supply of fluid under pressure to said pipe and to open said pipe to atmosphere.

5. The combination with a member having two different operating positions, of a pressure responsive element connected to said member and operable by fluid under pressure supplied to act on one side to move said member to one of its positions and operable by fluid under pressure supplied to act on the opposite side to move said member to its other position, a fluid pressure supply pipe, valve means having one position for supplying fluid under pressure from said pipe to said one side of said element and for opening the opposite side to atmosphere, a second position for supplying fluid under pressure from said pipe to said opposite side of said element and for opening said one side to atmosphere and a third position for opening both sides of said element to atmosphere, a pilot piston for controlling said valve means and having a connection with said element, said pilot piston being movable relative to said element upon supply of fluid under pressure to one face to move said valve means to said one position and being then movable by the fluid pressure acting on its one face along with said element to maintain said valve means in said one position, means for arresting said pilot piston after a certain degree of such movement with said element, means operative upon release of fluid under pressure from said one face of said pilot piston to move same relative to said element to move said valve means to its said second position, valve means controlling the supply of fluid under pressure to said supply pipe and operative upon supply of fluid under pressure to a chamber to cut-off such supply and open said pipe to atmosphere, and means operative upon supply of fluid under pressure to the degree required for moving said pilot piston to its arrested position for supplying fluid under pressure to said chamber and upon release of such fluid pressure from said pilot piston for releasing fluid under pressure from said chamber.

6. The combination with a member having two different operating positions, of a pressure responsive element connected to said member and operable by fluid under pressure supplied to act on one side to move said member to one of its positions and operable by fluid under pressure supplied to act on the opposite side to move said member to its other position, a fluid pressure supply pipe, valve means having one position for supplying fluid under pressure from said pipe to said one side of said element and for opening the opposite side to atmosphere, a second position for supplying fluid under pressure from said pipe to said opposite side of said element and for opening said one side to atmosphere and a third position for opening both sides of said element to atmosphere, a pilot piston for controlling said valve means and having a connection with said element, said pilot piston being movable relative to said element upon supply of fluid under pressure to one face to move said valve means to said one position and being then movable by the fluid pressure acting on its one face along with said element to maintain said valve means in said one position, means for arresting said pilot piston after a certain degree of such movement with said element, means operative upon release of fluid under pressure from said one face of said pilot piston to move same relative to said element to move said valve means to its said second position, valve means controlling the supply of fluid under pressure to said supply pipe and operative upon supply of fluid under pressure to a chamber to cut-off such supply and open said pipe to atmosphere, said pilot piston in its arrested position being operative to supply fluid under pressure to said chamber and when out of said arrested position venting said chamber to atmosphere.

7. The combination with a member having two different operating positions, of a pressure responsive element connected to said member and operable by fluid under pressure supplied to act on one side to move said member to one of its positions and operable by fluid under pressure supplied to act on the opposite side to move said member to its other position, a fluid pressure supply pipe, valve means having one position for supplying fluid under pressure from said pipe to said one side of said element and for opening the opposite side to atmosphere, a second position for supplying fluid under pressure from said pipe to said opposite side of said element and for opening said one side to atmosphere and a third position for opening both sides of said element to atmosphere, a pilot piston for controlling said valve means and having a connection with said element, said pilot piston being movable relative to said element upon supply of fluid under pressure to one face to move said valve means to said one position and being then movable by the fluid pressure acting on its one face along with said element to maintain said valve means in said one position, means for arresting said pilot piston after a certain degree of such movement with said element, means operative upon release of fluid under pressure from said one face of said pilot piston to move same relative to said element to move said valve means to its said second position, valve means controlling the supply of fluid under pressure to said supply pipe and operative upon supply of fluid under pressure to a chamber to cut off such supply and open said pipe to atmosphere, and means operable by said element upon movement of said member to said one position for supplying fluid under pressure from a passage to said chamber and upon movement of said member out of said one position to open said chamber to atmosphere.

8. The combination with a member having two different operating positions, of a pressure responsive element connected to said member and operable by fluid under pressure supplied to act on one side to move said member to one of its positions and operable by fluid under pressure supplied to act on the opposite side to move said member to its other position, a fluid pressure supply pipe, valve means having one position for supplying fluid under pressure from said pipe to said one side of said element and for opening the opposite side to atmosphere, a second position for supplying fluid under pressure from said pipe to said opposite side of said element and for opening said one side to atmosphere and a third position for opening both sides of said element to atmosphere, a pilot piston for controlling said valve means and having a connection with said element, said pilot piston being movable relative to said element upon supply of fluid under pressure to one face to move said valve means to said one position and being then movable by the fluid pressure acting on its one face along with said element to maintain said valve means in said one position, means for arresting said pilot piston after a certain degree of such movement with said element, means operative upon release of fluid under pressure from said one face of said pilot piston to move same relative to said element to move said valve means to its said second position, valve means controlling the supply of fluid under pressure to said supply pipe and operative upon supply of fluid under pressure to a chamber to cut off such supply and open said pipe to atmosphere, and means operable by said element upon movement of said member to said one position for supplying fluid under pressure from a passage to said chamber and upon movement of said member out of said one position to open said chamber to atmosphere, said pilot piston controlling the supply of fluid under pressure to said passage and being operative to supply fluid under pressure to said passage only in the arrested position and providing for release of fluid under pressure from said passage upon release of fluid under pressure on said pilot piston and upon movement of said pilot piston out of its arrested position.

9. The combination with a member having a neutral position, a second position at one side of neutral position and a third position at the opposite side of neutral position, a main piston connected to said member and having corresponding positions and operable upon supply of fluid under pressure to one side for moving said member in the direction from said second position toward said neutral position and said third position and upon supply of fluid under pressure to the opposite side for moving said member from said third position toward said neutral position and said second position, a pilot piston having corresponding positions and being movable to its second position and its third position by pressure of fluid supplied to act on either one side or the opposite side, means for moving said pilot piston to its neutral position upon release of fluid under pressure on said pilot piston, a fluid pressure supply pipe, valve means operable by said pilot piston upon supply of fluid under pressure to the side thereof for effecting movement to its second position for supplying fluid under pressure from said pipe to the side of said main piston for effecting movement thereof toward its second position, said valve means being operable by said pilot piston upon supply of fluid under pressure thereto for moving same to its third position for supplying fluid under pressure from said supply pipe to said main piston for moving same to its third position, said main piston being cooperable with said pilot piston in its neutral position upon movement of said main piston to neutral position to actuate said valve means to open both sides of said main piston to atmosphere, a valve device controlling a supply of fluid under pressure to said pipe and operable upon a certain increase in pressure in a chamber to cut-off such supply and open said pipe to atmosphere, said pilot piston in both its second or third positions being operative to supply fluid under pressure to said chamber and upon movement out of said second or third positions in the direction of its neutral position opening said chamber to atmosphere.

10. The combination with a member having a neutral position, a second position at one side of neutral position and a third position at the opposite side of neutral position, a main piston connected to said member and having corresponding positions and operable upon supply of fluid under pressure to one side for moving said member in the direction from said second position toward said neutral position and said third position and upon supply of fluid under pressure to the opposite side for moving said member from said third position toward said neutral position and said second position, a pilot piston having corresponding positions and being movable to its second position and its third position by pressure of fluid supplied to act on either one side or the opposite side, means for moving said pilot piston to its neutral position upon release of fluid under pressure on said pilot piston, a fluid pressure supply pipe, valve means operable by said pilot piston upon supply of fluid under pressure to the side thereof for effecting movement to its second position for supplying fluid under pressure from said pipe to the side of said main piston for effecting movement thereof toward its second position, said valve means being operable by said pilot piston upon supply of fluid under pressure thereto for moving same to its third position for supplying fluid under pressure from said supply pipe to said main piston for moving same to its third position, said main piston being cooperable with said pilot piston in its neutral position upon movement of said main piston to neutral position to actuate said valve means to open both sides of main piston to atmosphere, a valve device controlling the supply of fluid under pressure to said pipe and operable upon a certain increase in pressure in a chamber to cut-off such supply and open said pipe to atmosphere, said pilot piston in both its second or third positions being operative to supply fluid under pressure to said chamber and upon movement out of said second or third positions in the direction of its neutral position, opening said chamber to atmosphere, and means arranged in the connection between said pilot piston and chamber for restricting the flow of fluid under pressure into said chamber and providing for relatively rapid outflow of fluid pressure from said chamber.

11. The combination with a member having a neutral position, a second position at one side of neutral position and a third position at the opposite side of neutral position, a main piston connected to said member and having corresponding positions and operable upon supply of fluid under pressure to one side for moving said member in the direction from said second position toward said neutral position and said third position and upon supply of fluid under pressure to the opposite side for moving said member from said third position toward said neutral position and said second position, a pilot piston having corresponding positions and being movable to its second position and its third position by pressure of fluid supplied to act on either one side or the opposite side, means for moving said pilot piston to its neutral position upon release of fluid under pressure on said pilot piston, a fluid pressure supply pipe, valve means operable by said pilot piston under supply of fluid under pressure to the side thereof for effecting movement to its second position for supplying fluid under pressure from said pipe to the side of said main piston for effecting movement thereof toward its second position, said valve means being operable by said pilot piston upon supply of fluid under pressure thereto for moving same to its third position for supplying fluid under pressure from said supply pipe to said main piston for moving same to its third position, said main piston being cooperable with said pilot piston in its neutral position upon movement of said main piston to neutral position to actuate said valve means to open both sides of said main piston to atmosphere, a valve device controlling the supply of fluid under pressure to said pipe and operable upon a certain increase in pressure in a chamber to cut-off such supply and open said pipe to atmosphere, and means arranged to supply fluid under pressure to said chamber upon movement of said main piston to either its second or third positions and to release fluid under pressure from said chamber at all other times.

12. The combination with a member having a neutral position, a second position at one side of neutral position and a third position at the opposite side of neutral position, a main piston connected to said member and having corresponding positions and operable upon supply of fluid under pressure to one side for moving said member in the direction from said second position toward said neutral position and said third position and upon supply of fluid under pressure to the opposite side for moving said member from said third position toward said neutral position and said second position, a pilot piston having corresponding positions and being movable to its second position and its third position by pressure of fluid supplied to act on either one side or the opposite side, means for moving said pilot piston to its neutral position upon release of fluid under pressure on said pilot piston, a fluid pressure supply pipe, valve means operable by said pilot piston upon supply of fluid under pressure to the side thereof for effecting movement to its second position for supplying fluid under pressure from said pipe to the side of said main piston for effecting movement thereof toward its second position, said valve means being operable by said pilot piston upon supply of fluid under pressure thereto for moving same to its third position for supplying fluid under pressure from said supply pipe to said main piston for moving same to its third position, said main piston being cooperable with said pilot piston in its neutral position upon movement of said main piston to neutral position to actuate said valve means to open both sides of said main piston to atmosphere, a valve device comprising a pressure responsive element subject on one side to the pressure of fluid in a chamber, a spring acting on the opposite side of said element opposing the pressure of fluid in said chamber, valve means operable by said element upon an increase in pressure in said chamber to a degree exceeding the force of said spring for cutting off the supply of fluid under pressure to said supply pipe and for opening same to atmosphere, said spring being operative when the pressure in said chamber is of a lower degree to actuate said valve means to supply fluid under pressure to said supply pipe, means for adjusting the pressure of said spring on said element, and means arranged to supply fluid under pressure to said chamber upon movement of said main piston substantially to either its second or third positions and to open said chamber to atmosphere at all other times.

13. The combination with a member having a neutral position, a second position at one side of neutral position and a third position at the opposite side of neutral position, a main piston connected to said member and having corresponding positions and operable upon supply of fluid under pressure to one side for moving said member in the direction from said second position toward said neutral position and said third position and upon supply of fluid under pressure to the opposite side for moving said member from said third position toward said neutral position and said second position, a pilot piston having corresponding positions and being movable to its second position and its third position by pressure of fluid supplied to act on either one side or the opposite side, means for moving said pilot piston to its neutral position upon release of fluid under pressure on said pilot piston, a fluid pressure supply pipe, valve means operable by said pilot piston upon supply of fluid under pressure to the side thereof for effecting movement to its second position for supplying fluid under pressure from said pipe to the side of said main piston for effecting movement thereof toward its second position, said valve means being operable by said pilot piston upon supply of fluid under pressure thereto for moving same to its third position for supplying fluid under pressure from said supply pipe to said main piston for moving same to its third position, said main piston being cooperable with said pilot piston in its neutral position upon movement of said main piston to neutral position to actuate said valve means to open both sides of said main piston to atmosphere, cut-off valve means controlling the supply of fluid under pressure to said pipe, means operative upon a certain increase in pressure on either one side or the opposite side of said pilot piston for actuating said cut-off valve means to cut-off the supply of fluid under pressure to said pipe and open said pipe to atmosphere, and means for actuating said cut-off valve means to supply fluid under pressure to said pipe when the pressure acting on either one side or the other side of said pilot piston is of a lower degree.

14. In combination, a pressure responsive element movable from a first position to a second position upon supply of fluid under pressure to one side, a fluid pressure supply pipe, a valve device for controlling communication between said one side of said element, and atmosphere and said supply pipe, a member for controlling said valve device having a normal position providing for operation of said valve device to open said one side of said element to atmosphere and being operable upon a certain movement in one direction out of normal position to actuate said valve device to open said one side of said element to said pipe for supplying fluid under pressure to said one side of said element for moving same to said second position, a pilot piston for controlling said member, said pilot piston having a first position to position said member in said normal position and being movable in the direction of a second position upon supply of fluid under pressure to one side to move said member in said one direction, means arranged to limit movement of said member by said pilot piston to a degree providing for opening of said supply valve with said pilot piston intermediate its first and second positions, means connecting said element and pilot piston providing for movement of said pilot piston to its second position only upon substantial movement of said element to its second position, cut-off valve means operative to cut-off the supply of fluid under pressure to said pipe and to open said one side of said element to atmosphere, and means arranged to effect operation of said cut-off valve means subsequent to movement of said pilot piston to said second position.

15. In combination, a pressure responsive element movable from a first position to a second position upon supply of fluid under pressure to one side, a fluid pressure supply pipe, a valve device for controlling communication between said one side of said element and atmosphere and said supply pipe, a member for controlling said valve device having a normal position providing for operation of said valve device to open said one side of said element to atmosphere and being operable upon a certain movement in one direction out of normal position to actuate said valve device to open said one side of said element to said pipe for supplying fluid under pressure to said one side of said element for moving same to said second position, a pilot piston for controlling said member, said pilot piston having a first position to position said member in said normal position and being movable in the direction of a second position upon supply of fluid under pressure to one side to move said member in said one direction, means arranged to limit movement of said member by said pilot piston to a degree providing for opening of said supply valve with said pilot piston intermediate its first and second positions, means connecting said element and pilot piston providing for movement of said pilot piston to its second position only upon substantial movement of said element to its seond position, cut-off valve means operable upon a certain increase in pressure in a chamber to cut-off the supply of fluid under pressure to said pipe and to open said one side of said element to atmosphere, said pilot piston providing for supply of fluid under pressure to said chamber in its second position and opening said chamber to atmosphere at all other times.

16. An arrangement for controlling the operation of a clutch element to connect and disconnect a prime mover to and from a member to be driven comprising a cylinder, a piston therein movable by fluid under pressure supplied to one side to actuate said clutch element to connect said prime mover with said member, and by fluid under pressure supplied to the opposite side to actuate said clutch element to disconnect said prime mover from said member, a control pipe, a manual controller operative to supply fluid under pressure to said pipe and to release fluid under pressure therefrom, a valve device controlled by pressure of fluid in said pipe for controlling the pressure of fluid acting on said opposite side of said piston and operative with said pipe open to atmosphere to supply fluid under pressure to said opposite side of said piston and operative by a certain relatively low pressure in said pipe to open said opposite side of said piston to atmosphere, and another valve device controlled by pressure of fluid in said pipe for controlling the pressure on said one side of said piston, said other valve device opening said one side of said piston to said pipe until the pressure in said pipe and on said one side of said piston is increased to a certain degree above said low pressure and being then operative to open said one side of said piston to atmosphere.

17. An arrangement for moving a clutch control element from a clutch disengaging position to a clutch engaging position comprising a main piston operable upon supply of fluid under pressure to one side to move said clutch element from said disengaging position to said engaging position, a fluid pressure supply pipe, a valve device adjustable to either open said one side of said piston to atmosphere or to said supply pipe for supplying fluid under pressure to said one side of said piston, a lever having a non-resilient connection with said valve device and operable upon rocking in one direction to actuate said valve device to close communication between said one side of said piston and atmosphere and open said one side of said piston to said fluid pressure supply pipe, stop means arranged to limit movement of said lever to the position opening communication between said supply pipe and said one side of said piston, a pilot piston connected with said main piston and lever and operable upon supply of fluid under pressure to one face to initially move said lever to the position defined by said stop means and to then move with said main piston upon movement thereof by fluid pressure supplied from said supply pipe, a cut-off valve device controlled by pressure of fluid in a chamber and operative with said chamber open to atmosphere to supply fluid under pressure to said supply pipe and upon supply of fluid under pressure to said chamber to cut-off the supply of fluid to said supply pipe and open said supply pipe to atmosphere, said pilot piston controlling the pressure of fluid in said chamber and being operative upon movement to a position in which said clutch control element is substantially in said clutch engaging position to supply fluid under pressure to said chamber and being operative when out of such position to open said chamber to atmosphere.

18. An arrangement for moving a clutch control element from a clutch disengaging position to a clutch engaging position comprising a main piston operable upon supply of fluid under pressure to one side to move said clutch element from said disengaging position to said engaging position, a fluid pressure supply pipe, a valve device adjustable to either open said one side of said piston to atmosphere or to said supply pipe for supplying fluid under pressure to said one side of said piston, a lever having a non-resilient connection with said valve device and operable upon rocking in one direction to actuate said valve device to close communication between said one side of said piston and atmosphere and open said one side of said piston to said fluid pressure supply pipe, stop means arranged to limit movement of said lever to the position opening communication between said supply pipe and said one side of said piston, a pilot piston connected with said main piston and lever and operable upon supply of fluid under pressure to one face to initially move said lever to the position defined by said stop means and to then move with said main piston upon movement thereof by fluid pressure supplied from said supply pipe, valve means controlling the supply of fluid under pressure to said supply pipe and operative to cut-off such supply and open said pipe to atmosphere, a spring, a pressure responsive element controlled by the opposing pressures of fluid in a chamber and of said spring for controlling said valve means and providing for operation of said valve means to supply fluid under pressure to said pipe with said chamber open to the atmosphere and being operative upon an increase in fluid pressure in said chamber to a degree for overcoming the pressure of said spring to actuate said valve means to open said pipe to atmosphere, said pilot piston controlling the pressure of fluid in said chamber and being operative upon movement with said main piston to a position in which said clutch element is substantially in its clutch engaging position to supply fluid under pressure to said chamber and being operative when out of such position to open said chamber to atmosphere.

19. An arrangement for moving a clutch control element from a clutch disengaging position to a clutch engaging position comprising a main piston operable upon supply of fluid under pressure to one side to move said clutch element from said disengaging position to said engaging position, a fluid pressure supply pipe, a valve device adjustable to either open said one side of said piston to atmosphere or to said supply pipe for supplying fluid under pressure to said one side of said piston, a lever having a non-resilient connection with said valve device and operable upon rocking in one direction to actuate said valve device to close communication between said one side of said piston and atmosphere and open said one side of said piston to said fluid pressure supply pipe, stop means arranged to limit movement of said lever to the position opening communication between said supply pipe and said one side of said piston, a pilot piston connected with said main piston and lever and operable upon supply of fluid under pressure to one face to initially move said lever to the position defined by said stop means and to then move with said main piston upon movement thereof by fluid pressure supplied from said supply pipe, valve means controlling the supply of fluid under pressure to said supply pipe and operative to cut-off such supply and open said pipe to atmosphere, a spring, a pressure responsive element controlled by the opposing pressures of fluid in a chamber and of said spring for controlling said valve means and providing for operation of said valve means to supply fluid under pressure to said pipe with said chamber open to the atmosphere and being operative upon an increase in fluid pressure in said chamber to a degree for overcoming the pressure of said spring to actuate said valve means to open said pipe to atmosphere, said pilot piston controlling the pressure of fluid in said chamber and being operative upon movement with said main piston to a position in which said clutch element is substantially in its clutch engaging position to supply fluid under pressure to said chamber and being operative when out of such position to open said chamber to atmosphere, a choke arranged to restrict flow of fluid under pressure from said pilot piston to said chamber, and a check valve arranged in a communication by passing said choke for preventing flow of fluid under pressure in the direction from said pilot piston to said chamber but providing for relatively rapid flow of fluid under pressure out of said chamber in the direction of said pilot piston.

20. An arrangement for moving a clutch control element from a clutch disengaging position to a clutch engaging position comprising a main piston operable upon supply of fluid under pressure to one side to move said clutch element from said disengaging position to said engaging position, a fluid pressure supply pipe, a valve device adjustable to either open said one side of said piston to atmosphere or to said supply pipe for supplying fluid under pressure to said one side of said piston, a lever having a non-resilient connection with said valve device and operable upon rocking in one direction to actuate said valve device to close communication between said one side of said piston and atmosphere and open said one side of said piston to said fluid pressure supply pipe, stop means arranged to limit movement of said lever to the position opening communication between said supply pipe and said one side of said piston, a pilot piston connected with said main piston and lever and operable upon supply of fluid under pressure to one face to initially move said lever to the position defined by said stop means and to then move with said main piston upon movement thereof by fluid pressure supplied from said supply pipe, valve means controlling the supply of fluid under pressure to said supply pipe and operative to cut-off such supply and open said pipe to atmosphere, a spring, a pressure responsive element controlled by the opposing pressures of fluid in a chamber and of said spring for controlling said valve means and providing for operation of said valve means to supply fluid under pressure to said pipe with said chamber open to the atmosphere and being operative upon an increase in fluid pressure in said chamber to a degree for overcoming the pressure of said spring to actuate said valve means to open said pipe to atmosphere, said pilot piston controlling the pressure of fluid in said chamber and being operative upon movement with said main piston to a position in which said clutch element is substantially in its clutch engaging position to supply fluid under pressure to said chamber and being operative when out of such position to open said chamber to atmosphere, and means for varying the pressure of said spring to thereby regulate the pressure of fluid required in said chamber for actuating said cut-off valve device.

21. In combination, a clutch control element having a forward position for connecting a prime mover to a member to be driven for operating said member in one direction, a reverse position for connecting said prime mover to said member for operating same in the reverse direction and a neutral position intermediate the forward and reverse positions for disconnecting the prime mover from the member to be driven, a clutch control piston connected to said member and operative upon supply of fluid under pressure to one side for moving said member in the direction from said forward position toward neutral and reverse positions and upon supply of fluid under pressure to the opposite side to move said member in the direction from said reverse position toward the neutral and forward positions, a fluid pressure supply pipe, a controller comprising an operating lever having a neutral position and being operable upon movement in one direction from neutral position to supply fluid from said pipe to one side of said piston and upon movement in the opposite direction from neutral position to supply fluid from said pipe to the opposite side of said piston and being operable in neutral position to open both sides of said piston to atmosphere, a pilot piston connected to said controller lever and to said clutch control piston and being movable relative to said control piston upon supply of fluid under pressure to one face with the opposite face open to atmosphere to actuate said lever in said one direction and upon supply of fluid under pressure to its opposite face with said one face open to atmosphere for actuating said lever in said opposite direction, means operative to move said pilot piston to a neutral position for neutralizing said lever upon both faces of said pilot piston being open to atmosphere, manually controlled means for selectively supplying fluid under pressure to and opening to atmosphere the opposite faces of said pilot piston, a cut-off valve device controlling the supply of fluid under pressure to said supply pipe and operative upon a certain increase in pressure in a chamber to cut-off said supply and open said pipe and thereby the connected side of said clutch control piston to atmosphere, and a pipe connecting said chamber to said pilot piston for control thereby, said pilot piston being operative to open said chamber to the face of said pilot piston supplied with fluid under pressure upon movement of said pilot piston to the position providing for said clutch control piston positioning said clutch control member in either its forward or reverse position, to thereby supply fluid under pressure to said chamber to actuate said cut-off valve device, said pipe being open at all other times to a face of said pilot piston open to the atmosphere.

22. In combination, a clutch control element having a forward position for connecting a prime mover to a member to be driven for operating said member in one direction, a reverse position for connecting said prime mover to said member for operating same in the reverse direction and a neutral position intermediate the forward and reverse positions for disconnecting the prime mover from the member to be driven, a clutch control piston connected to said member and operative upon supply of fluid under pressure to one side for moving said member in the direction from said forward position toward neutral and reverse positions and upon supply of fluid under pressure to the opposite side to move said member in the direction from said reverse position toward the neutral and forward positions, a fluid pressure supply pipe, a controller comprising an operating lever having a neutral position and being operable upon movement in one direction from neutral position to supply fluid from said pipe to the opposite side of said piston and being operable in neutral position to open both sides of said piston to atmosphere, a pilot piston connected to said controller lever and to said clutch control piston and being movable relative to said control piston upon supply of fluid under pressure to one face with the opposite face open to atmosphere to actuate said lever in said one direction and upon supply of fluid under pressure to its opposite face with said one face open to atmosphere for actuating said lever in said opposite direction, means operative to move said pilot piston to a neutral position for neutralizing said lever upon both faces of said pilot piston being open to atmosphere, manually controlled means for selectively supplying fluid under pressure to and opening to atmosphere the opposite faces of said pilot piston, a cut-off valve device controlling the supply of fluid under pressure to said supply pipe and operative upon a certain increase in pressure in a chamber to cut-off said supply and open said pipe and thereby the connected side of said clutch control piston to atmosphere, and a pipe connecting said chamber to said pilot piston for control thereby, said pilot piston comprising two spaced pressure heads cooperating to form a chamber between said heads which is in constant communication with the atmosphere, said pipe being so arranged with respect to said pilot piston as to be open to the chamber between said two pressure heads with said pilot piston in all positions corresponding to positions of said clutch control piston in which said clutch element is out of said forward or reverse positions, said pilot piston being operative to open said pipe to either one face or the other thereof which ever is supplied with fluid pressure, upon movement of said clutch control piston to substantially the position for positioning said clutch control element in either its forward or reverse position.

23. In combination, a pressure responsive element movable by pressure of fluid in a chamber, valve means operable to supply fluid under pressure to said chamber, a valve device arranged to control said supply of fluid under pressure to said chamber and operable to cut off such supply and to vent fluid under pressure from said chamber, actuating means operable upon movement relative to said element to effect operation of said valve means and upon further movement to a certain position to effect operation of said valve device, control means connecting said actuating means to said valve means and element providing for movement of said actuating means relative to said element to effect operation of said valve means, and means included in said control means for rendering said element operable to control said further movement of said actuating means and providing for said actuating means obtaining said certain position in a chosen position of said element.

24. In combination, a pressure responsive element movable by pressure of fluid in a chamber, valve means operable to supply fluid under pressure to said chamber, a valve device arranged to control said supply of fluid under pressure to said chamber and operable to cut off such supply and to vent fluid under pressure from said chamber, actuating means operable upon movement relative to said element to effect operation of said valve means and upon further movement to a certain position to effect operation of said valve device, control means connecting said actuating means to said valve means and element providing for movement of said actuating means relative to said element to effect operation of said valve means, and means included in said control means operable to limit movement of said actuating means relative to said element to the degree required for effecting operation of said valve means and providing for said actuating means obtaining said certain position in a chosen positon of said element.

ROY R. STEVENS.

REFERENCES CITED

The following references are of record in the file of this patent:

UNITED STATES PATENTS

| Number | Name | Date |
| --- | --- | --- |
| 2,206,771 | Gugas | July 2, 1940 |
| 2,117,852 | Pearmain | May 17, 1938 |
| 1,858,999 | McCollum et al. | May 17, 1932 |
| 907,711 | Anthony | Dec. 29, 1908 |
| 901,980 | Mayo et al. | Oct. 27, 1908 |
| 1,199,640 | Vincent | Sept. 26, 1916 |
| 2,106,608 | Kelley | Jan. 25, 1938 |
| 2,175,152 | Hey | Oct. 3, 1939 |
| 1,096,106 | Henry | May 12, 1914 |
| 965,270 | Zelle | July 26, 1910 |
| 719,109 | Hanson | June 27, 1903 |
| 1,231,257 | Herr | June 26, 1917 |
| 1,258,033 | Martin | Mar. 5, 1918 |
| 1,194,346 | Akans | Aug. 15, 1916 |
| 1,264,166 | Elvin | Apr. 30, 1918 |
| 653,187 | Smith | July 3, 1900 |

FOREIGN PATENTS

| Number | Country | Date |
| --- | --- | --- |
| 454,861 | Great Britain | Apr. 6, 1935 |